(12) United States Patent
Jin et al.

(10) Patent No.: US 11,784,853 B2
(45) Date of Patent: Oct. 10, 2023

(54) CHANNEL MEASUREMENT METHOD AND COMMUNICATION APPARATUS

(71) Applicant: HUAWEI TECHNOLOGIES CO., LTD., Guangdong (CN)

(72) Inventors: Huangping Jin, Shanghai (CN); Shibin Ge, Shanghai (CN); Zhimeng Zhong, Shanghai (CN); Yong Liu, Shanghai (CN); Xiaoyan Bi, Ottawa (CA); Li Fan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/707,323

(22) Filed: Mar. 29, 2022

(65) Prior Publication Data

US 2022/0224568 A1 Jul. 14, 2022

Related U.S. Application Data

(63) Continuation of application No. PCT/CN2019/109731, filed on Sep. 30, 2019.

(51) Int. Cl.
*H04B 17/364* (2015.01)
*H04L 25/02* (2006.01)
*H04W 56/00* (2009.01)

(52) U.S. Cl.
CPC ..... *H04L 25/0228* (2013.01); *H04W 56/0055* (2013.01)

(58) Field of Classification Search
CPC ............. H04L 25/0228; H04L 5/0048; H04W 56/0055; H04B 7/0421; H04B 17/364; H04B 7/0456
See application file for complete search history.

(56) References Cited

U.S. PATENT DOCUMENTS

| 2014/0269502 | A1 | 9/2014 | Forenza et al. |
| 2019/0181921 | A1 | 6/2019 | Lee et al. |
| 2019/0349964 | A1* | 11/2019 | Liou ................... H04B 7/0626 |

FOREIGN PATENT DOCUMENTS

| CN | 106685623 A | 5/2017 |
| CN | 106817722 A | 6/2017 |
| CN | 107370558 A | 11/2017 |
| CN | 107911153 A | 4/2018 |
| CN | 108880646 A | 11/2018 |

(Continued)

OTHER PUBLICATIONS

Han et al., "Efficient downlink channel reconstruction for FDD transmission systems," 2018 27th Wireless and Optical Communication Conference (WOCC), Jun. 7, 2018, 5 pages.

(Continued)

*Primary Examiner* — Minh Trang T Nguyen
(74) *Attorney, Agent, or Firm* — Fish & Richardson P.C.

(57) ABSTRACT

Example channel measurement methods and a communication apparatus are described. One example method include receiving a precoded reference signal and indication information by a terminal device, where the indication information is used to indicate a relative delay between a first delay and a second delay, and the first delay and the second delay are determined through uplink channel measurement. The terminal device performs channel measurement based on the precoded reference signal and the indication information.

21 Claims, 5 Drawing Sheets

(56) References Cited

FOREIGN PATENT DOCUMENTS

| CN | 109309537 A | 2/2019 |
| WO | 2018082641 A1 | 5/2018 |
| WO | 2019104282 A1 | 5/2019 |

OTHER PUBLICATIONS

Han et al., "FDD Massive MIMO Based on Efficient Downlink Channel Reconstruction," IEEE Transactions on Wireless Communications, vol. 67, No. 6, Jun. 2019, 15 pages.
PCT International Search Report and Written Opinion issued in International Application No. PCT/CN2019/109731 dated Jun. 29, 2020, 16 pages (with English translation).
Rui et al., "Estimation Method for Multipath Parameters with Multi-carrier Excitation Signal," Journal of the China Railway Society, vol. 37, No. 7, Jul. 2015, 7 pages (with English abstract).
Extended European Search Report issued in European Application No. 19947684.7 dated Aug. 12, 2022, 10 pages.
Han et al., "Efficient Downlink Channel Reconstruction for FDD Multi-Antenna Systems," arXiv:1805.07027v1, May 18, 2018, 23 pages.
Office Action issued in Chinese Application No. 201980100235.9 dated Aug. 22, 2022, 7 pages.

\* cited by examiner

US 11,784,853 B2

CHANNEL MEASUREMENT METHOD AND COMMUNICATION APPARATUS

CROSS-REFERENCE TO RELATED APPLICATIONS

This application is a continuation of International Application No. PCT/CN2019/109731, filed on Sep. 30, 2019. The disclosures of the aforementioned application is hereby incorporated by reference in its entirety.

TECHNICAL FIELD

This application relates to the communication field, and more specifically, to a channel measurement method and a communication apparatus.

BACKGROUND

In a massive multiple-input multiple-output (massive multiple-input multiple-output, Massive MIMO) technology, when a network device sends data to a terminal device, the network device needs to rely on channel state information (channel state information, CSI) fed back by the terminal device to the network device. The CSI fed back by the terminal device greatly affects system performance.

In some systems such as a frequency division duplex (frequency division duplex, FDD) system, uplink and downlink physical channels have partial reciprocity, such as reciprocity of multipath angles and reciprocity of delays. Therefore, a CSI obtaining solution may be designed based on the partial reciprocity.

Based on an idea of the partial reciprocity, some prior information may be estimated by using uplink channel information, including an angle and delay information of an uplink channel. Then, the network device loads the obtained angle or delay information to a downlink pilot, and notifies the terminal device to measure and feed back supplementary information that the network device needs to obtain. Finally, the network device reconstructs a downlink channel or precoding matrix based on information measured by using an uplink pilot and the supplementary information fed back by the terminal device.

When a timing error exists on the uplink and downlink channels, a shift deviation exists between the delay information estimated by using the uplink channel and actual delay information of the downlink channel. Consequently, there is a large error in reconstructing the downlink channel by using the delay information estimated by using the uplink channel.

SUMMARY

This application provides a channel measurement method and a communication apparatus, to reduce impact of a delay deviation caused by an uplink and downlink timing error when channel estimation is performed based on an idea of partial reciprocity.

According to a first aspect, a channel measurement method is provided. The method may be performed by a terminal device, or may be performed by a chip, a chip system, or a circuit disposed in the terminal device. This is not limited in this application.

The method may include: receiving a precoded reference signal and indication information, where the indication information is used to indicate a relative delay between a first delay and a second delay, and the first delay and the second delay are determined through uplink channel measurement; and performing channel measurement based on the precoded reference signal and the indication information.

Optionally, the method is applied to a scenario in which channel measurement is performed based on partial reciprocity, for example, a frequency division duplex (frequency division duplex, FDD) system.

Optionally, the indication information may be carried in physical layer signaling. The physical layer signaling may include, for example, downlink control information (downlink control information, DCI).

Optionally, the indication information is carried in higher layer signaling. The higher layer signaling may include, for example, a media access control (media access control, MAC) control element (control element, CE) or a radio resource control (radio resource control, RRC) message.

Optionally, for a relative delay, for example, a delay is used as a reference delay to determine a relative delay between another delay and the reference delay.

Optionally, a network device may encode a discrete Fourier transform (Discrete Fourier Transform, DFT) vector subscript to indicate the relative delay.

Optionally, the network device may jointly indicate the relative delay by using an angle and a delay.

Based on the foregoing technical solution, the network device may indicate, by using a feature that a relative delay is unrelated to absolute timing, information about the relative delay to the terminal device, and the terminal device may obtain information about an absolute delay based on the information about the relative delay. Considering that an uplink and a downlink are two independent links, there may be a timing error of absolute time, and there is reciprocity between delays, the relative delay remains unchanged. Therefore, in this embodiment of this application, the network device indicates the relative delay, that is, a relative delay between a plurality of delays, to the terminal device, so that impact caused by a possible deviation between absolute positions of uplink and downlink delays can be reduced, and performance of channel estimation can be ensured. In addition, signaling overheads caused by indicating delays can also be reduced by indicating the relative delay.

With reference to the first aspect, in some implementations of the first aspect, the precoded reference signal corresponds to one or more ports, and the one or more ports include a first port; and the first delay and the second delay correspond to the first port.

In other words, the relative delay may be a relative delay between delays corresponding to a same port.

Based on the foregoing technical solution, the relative delay may be a relative delay between a plurality of delays corresponding to a single port (for example, the first port). Based on the relative delay between the plurality of delays corresponding to the port, delay information corresponding to the port may be determined. In other words, based on a relative delay between a plurality of delays corresponding to a port, delay information of the port corresponding to an angle vector may be obtained.

With reference to the first aspect, in some implementations of the first aspect, the precoded reference signal is obtained by precoding a reference signal based on a first angle vector corresponding to the first port.

For example, each port corresponds to one angle vector. That the first delay and the second delay correspond to the first port may also be understood as that the first delay and the second delay correspond to the first angle vector.

With reference to the first aspect, in some implementations of the first aspect, the precoded reference signal corresponds to one or more ports, and the one or more ports include a second port and a third port; and the first delay corresponds to the second port, and the second delay corresponds to the third port.

In other words, the relative delay may be a relative delay between delays corresponding to different ports.

For example, a delay corresponding to any port (for example, the second port or the third port) may be used as a reference delay.

Based on the foregoing technical solution, the relative delay may be a relative delay between a plurality of delays corresponding to a plurality of ports (for example, the second port and the third port). Based on the relative delay between the plurality of delays corresponding to the plurality of ports, delay information corresponding to the plurality of ports may be determined In other words, based on the relative delay between the plurality of delays corresponding to the plurality of ports, delay information of ports corresponding to a plurality of angle vectors may be obtained.

With reference to the first aspect, in some implementations of the first aspect, the precoded reference signal is obtained by precoding a reference signal based on a second angle vector corresponding to the second port and a third angle vector corresponding to the third port.

For example, each port corresponds to one angle vector. That the first delay corresponds to the second port, and the second delay corresponds to the third port may also be understood as that the first delay corresponds to the second angle vector, and the second delay corresponds to the third angle vector.

With reference to the first aspect, in some implementations of the first aspect, that the indication information is used to indicate a relative delay between a first delay and a second delay includes. The indication information is used to indicate a relative delay of a plurality of ports, and the relative delay of the plurality of ports includes the relative delay between the first delay and the second delay.

That is, the relative delay may be a relative delay between delays corresponding to different ports. In other words, a relative delay between delays corresponding to a plurality of ports may be indicated based on one piece of indication information.

For example, a plurality of ports share one reference delay.

For example, a delay of a port may be specified in advance or considered by default as the reference delay.

Based on the foregoing technical solution, delay information corresponding to each port may be obtained based on the relative delay. That is, the terminal device may determine, based on a relative delay between delays corresponding to each port, the delay information corresponding to each port. Alternatively, in other words, the terminal device may determine, based on a relative delay between delays corresponding to each angle vector, delay information corresponding to each angle vector.

With reference to the first aspect, in some implementations of the first aspect, the plurality of ports correspond to a same reference delay.

For example, a delay corresponding to any one of the plurality of ports is used as a reference delay, and the relative delay may include a relative delay between delays corresponding to another port and the reference delay. That is, one delay is selected from delays corresponding to a plurality of ports as a reference delay, and the relative delay includes a relative delay between the delays corresponding to the plurality of ports and the reference delay.

With reference to the first aspect, in some implementations of the first aspect, that the indication information is used to indicate a relative delay between a first delay and a second delay includes: The indication information is used to indicate a relative delay of a fourth port, and the relative delay of the fourth port includes the relative delay between the first delay and the second delay.

Based on the foregoing technical solution, for each port, information about a relative delay may be independently indicated. In other words, for each port, the network device indicates information about the relative delay corresponding to the port to the terminal device. A plurality of pieces of indication information indicating a relative delay corresponding to a plurality of ports may be carried in different fields in same signaling, or may be sent to the terminal device by using different signaling.

With reference to the first aspect, in some implementations of the first aspect, the first delay or the second delay is a reference delay.

For example, the reference delay may be a delay zero point. There are at least two cases for the delay zero point.

In a possible case, the delay zero point represents a delay whose absolute delay is zero. In other words, the delay whose absolute delay is zero may be used as the reference delay.

In another possible case, one of a plurality of delays may be set to zero, and the reference delay may be a relative delay between another delay and the delay. For example, it may be specified in advance, for example, it is specified in a protocol that one of a plurality of delays is zero, for example, the $1^{st}$ delay is zero. For the terminal device, it is considered that the $1^{st}$ delay is zero. Details are described in the following embodiments.

For example, it may be specified in advance, for example, it is specified in a protocol that a zero point of a pilot port is a reference point of a delay, that is, a reference delay.

According to a second aspect, a channel measurement method is provided. The method may be performed by a network device, or may be performed by a chip, a chip system, or a circuit disposed in the network device. This is not limited in this application.

The method may include: generating a precoded reference signal; and sending the precoded reference signal and indication information, where the indication information is used to indicate a relative delay between a first delay and a second delay, and the first delay and the second delay are determined through uplink channel measurement.

Based on the foregoing technical solution, the network device may indicate, by using a feature that a relative delay is unrelated to absolute timing, information about the relative delay to a terminal device. Considering that an uplink and a downlink are two independent links, there may be a timing error of absolute time, and there is reciprocity between delays, the relative delay remains unchanged. Therefore, in this embodiment of this application, the network device indicates the relative delay, that is, a relative delay between a plurality of delays, to the terminal device, so that impact caused by a possible deviation between absolute positions of uplink and downlink delays can be reduced, and performance of channel estimation can be ensured. In addition, signaling overheads caused by indicating delays can also be reduced by indicating the relative delay.

With reference to the second aspect, in some implementations of the second aspect, the precoded reference signal corresponds to one or more ports, and the one or more ports include a first port; and the first delay and the second delay correspond to the first port.

In other words, the relative delay may be a relative delay between delays corresponding to a same port.

Based on the foregoing technical solution, the relative delay indicated by the network device to the terminal device may be a relative delay between a plurality of delays corresponding to a single port (for example, the first port).

With reference to the second aspect, in some implementations of the second aspect, the generating a precoded reference signal includes: precoding a reference signal based on a first angle vector corresponding to the first port, to obtain the precoded reference signal.

For example, each port corresponds to one angle vector. That the first delay and the second delay correspond to the first port may also be understood as that the first delay and the second delay correspond to the first angle vector.

With reference to the second aspect, in some implementations of the second aspect, the precoded reference signal corresponds to one or more ports, and the one or more ports include a second port and a third port; and the first delay corresponds to the second port, and the second delay corresponds to the third port.

In other words, the relative delay may be a relative delay between delays corresponding to different ports.

For example, a delay corresponding to any port (for example, the second port or the third port) may be used as a reference delay.

Based on the foregoing technical solution, the relative delay indicated by the network device to the terminal device may be a relative delay between a plurality of delays corresponding to a plurality of ports (for example, the second port and the third port).

With reference to the second aspect, in some implementations of the second aspect, the generating a precoded reference signal includes: precoding a reference signal based on a second angle vector corresponding to the second port and a third angle vector corresponding to the third port, to obtain the precoded reference signal.

For example, each port corresponds to one angle vector. That the first delay corresponds to the second port, and the second delay corresponds to the third port may also be understood as that the first delay corresponds to the second angle vector, and the second delay corresponds to the third angle vector.

With reference to the second aspect, in some implementations of the second aspect, that the indication information is used to indicate a relative delay between a first delay and a second delay includes: The indication information is used to indicate a relative delay of a plurality of ports, and the relative delay of the plurality of ports includes the relative delay between the first delay and the second delay.

That is, the relative delay may be a relative delay between delays corresponding to different ports. In other words, a relative delay between delays corresponding to a plurality of ports may be indicated based on one piece of indication information.

For example, a plurality of ports share one reference delay.

For example, a delay of a port may be specified in advance or considered by default as the reference delay.

With reference to the second aspect, in some implementations of the second aspect, the plurality of ports correspond to a same reference delay.

For example, a delay corresponding to any one of the plurality of ports is used as a reference delay, and the relative delay may include a relative delay between delays corresponding to another port and the reference delay. That is, one delay is selected from delays corresponding to a plurality of ports as a reference delay, and the relative delay includes a relative delay between the delays corresponding to the plurality of ports and the reference delay.

With reference to the second aspect, in some implementations of the second aspect, that the indication information is used to indicate a relative delay between a first delay and a second delay includes: The indication information is used to indicate a relative delay of a fourth port, and the relative delay of the fourth port includes the relative delay between the first delay and the second delay.

Based on the foregoing technical solution, for each port, the network device may independently indicate information about a relative delay. In other words, for each port, the network device indicates information about the relative delay corresponding to the port to the terminal device. A plurality of pieces of indication information indicating a relative delay corresponding to a plurality of ports may be carried in different fields in same signaling, or may be sent to the terminal device by using different signaling.

With reference to the second aspect, in some implementations of the second aspect, the first delay or the second delay is a reference delay.

For example, the reference delay may be a delay zero point. There are at least two cases for the delay zero point.

In a possible case, the delay zero point represents a delay whose absolute delay is zero. In other words, the delay whose absolute delay is zero may be used as the reference delay.

In another possible case, one of a plurality of delays may be set to zero, and the reference delay may be a relative delay between another delay and the delay. For example, it may be specified in advance, for example, it is specified in a protocol that one of a plurality of delays is zero, for example, the $1^{st}$ delay is zero. For the terminal device, it is considered that the $1^{st}$ delay is zero. Details are described in the following embodiments.

According to a third aspect, a communication apparatus is provided. The communication apparatus is configured to perform the communication method provided in the first aspect. Specifically, the communication apparatus may include a module configured to perform the communication method provided in the first aspect.

According to a fourth aspect, a communication apparatus is provided. The communication apparatus is configured to perform the communication method provided in the second aspect. Specifically, the communication apparatus may include a module configured to perform the communication method provided in the second aspect.

According to a fifth aspect, a communication apparatus is provided. The communication apparatus includes a processor. The processor is coupled to a memory, and may be configured to execute instructions in the memory, to implement the communication method according to any one of the first aspect or the possible implementations of the first aspect. Optionally, the communication apparatus further includes the memory. Optionally, the communication apparatus further includes a communication interface, the processor is coupled to the communication interface, and the communication interface is configured to input and/or output information. The information includes at least one of the instructions and data.

In an implementation, the communication apparatus is a terminal device. When the communication apparatus is the terminal device, the communication interface may be a transceiver or an input/output interface.

In another implementation, the communication apparatus is a chip or a chip system. When the communication apparatus is the chip or the chip system, the communication interface may be an input/output interface, or may be an input/output interface, an interface circuit, an output circuit, an input circuit, a pin, a related circuit, or the like on the chip or the chip system. The processor may alternatively be embodied as a processing circuit or a logic circuit.

In another implementation, the communication apparatus is a chip or a chip system disposed in a terminal device.

Optionally, the transceiver may be a transceiver circuit. Optionally, the input/output interface may be an input/output circuit.

According to a sixth aspect, a communication apparatus is provided. The communication apparatus includes a processor. The processor is coupled to a memory, and may be configured to execute instructions in the memory, to implement the communication method according to any one of the second aspect or the possible implementations of the second aspect. Optionally, the communication apparatus further includes the memory. Optionally, the communication apparatus further includes a communication interface, the processor is coupled to the communication interface, and the communication interface is configured to input and/or output information. The information includes at least one of the instructions and data.

In an implementation, the communication apparatus is a network device. When the communication apparatus is the network device, the communication interface may be a transceiver or an input/output interface.

In another implementation, the communication apparatus is a chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

In another implementation, the communication apparatus is a chip or a chip system disposed in a network device.

Optionally, the transceiver may be a transceiver circuit. Optionally, the input/output interface may be an input/output circuit.

According to a seventh aspect, a computer-readable storage medium is provided. The computer-readable storage medium stores a computer program. When the computer program is executed by a communication apparatus, the communication apparatus is enabled to implement the communication method according to any one of the first aspect or the possible implementations of the first aspect.

According to an eighth aspect, a computer-readable storage medium is provided. The computer-readable storage medium stores a computer program. When the computer program is executed by a communication apparatus, the communication apparatus is enabled to implement the communication method according to any one of the second aspect or the possible implementations of the second aspect.

According to a ninth aspect, a computer program product including instructions is provided. When the instructions are executed by a computer, a communication apparatus is enabled to implement the communication method provided in the first aspect.

According to a tenth aspect, a computer program product including instructions is provided. When the instructions are executed by a computer, a communication apparatus is enabled to implement the communication method provided in the second aspect.

According to an eleventh aspect, a communication system is provided. The communication system includes the foregoing network device and terminal device.

DESCRIPTION OF EMBODIMENTS

Figure 1:
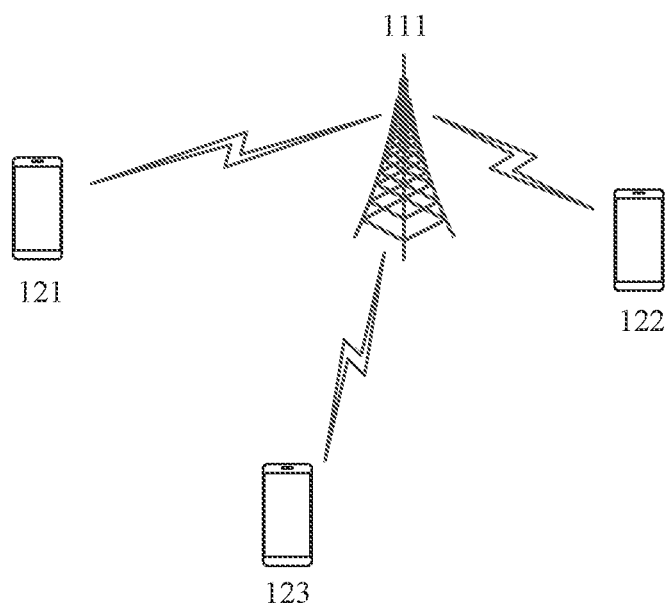
FIG. 1 and FIG. 2 are schematic diagrams of communication systems to which embodiments of this application are applicable.

The following describes technical solutions in this application with reference to the accompanying drawings.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD), a universal mobile telecommunications system (universal mobile telecommunication system, UMTS), a 5th generation (5th generation, 5G) mobile communication system, or a new radio (new radio, NR) system. The 5G mobile communication system may include non-standalone (non-standalone, NSA) and/or standalone (standalone, SA).

The technical solutions provided in this application are further applicable to a future communication system, for example, a 6th generation mobile communication system. The communication system may alternatively be a PLMN network, a device-to-device (device-to-device, D2D) network, a machine to machine (machine to machine, M2M) network, an internet of things (internet of things, IoT) network, or another network. The IoT network may include, for example, an internet of vehicles. Communication modes in an internet of vehicles system are collectively referred to as V2X (where X represents everything). For example, V2X communication includes vehicle-to-vehicle (vehicle to vehicle, V2V) communication, vehicle-to-infrastructure (vehicle to infrastructure, V2I) communication, vehicle-to-pedestrian (vehicle to pedestrian, V2P) communication, or vehicle-to-network (vehicle to network, V2N) communication.

A terminal device in the embodiments of this application may also be referred to as user equipment (user equipment, UE), a mobile station (mobile station, MS), a mobile terminal (mobile terminal, MT), an access terminal, a subscriber unit, a subscriber station, a mobile station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device that has a wireless connection function. Currently, some examples of the terminal are a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a 5G network, or a terminal device in a future evolved public land mobile network (public land mobile network, PLMN). This is not limited in the embodiments of this application.

By way of example and not limitation, in the embodiments of this application, the terminal device may alternatively be a wearable device. The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not only a hardware device, but also implements a powerful function through software support, data exchange, and cloud interaction. In a board sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device in the embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In the embodiments of this application, an IoT technology may implement massive connections, deep coverage, and terminal power saving by using, for example, a narrowband (narrow band, NB) technology.

In addition, in the embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and sending uplink data to the network device.

A network device in the embodiments of this application may be a device configured to communicate with a terminal device. The network device may be an evolved NodeB (evolved NodeB, eNB or eNodeB) in an LTE system, or may be a radio controller in a cloud radio access network (cloud radio access network, CRAN) scenario. Alternatively, the network device may be a relay station, an access point, a vehicle-mounted device, a wearable device, a network device in a future 5G network, a network device in a future evolved PLMN network, or the like. This is not limited in the embodiments of this application.

The network device in the embodiments of this application may be a device in a wireless network, for example, a radio access network (radio access network, RAN) node that connects a terminal to the wireless network. Currently, some examples of the RAN node are a next generation NodeB gNB, a transmission reception point (transmission reception point, TRP), an evolved NodeB (evolved NodeB, eNB), a home base station, a baseband unit (baseband unit, BBU), and an access point (access point, AP) in a Wi-Fi system.

In a network structure, the network device may include a centralized unit (centralized unit, CU) node or a distributed unit (distributed unit, DU) node, a RAN device including a CU node and a DU node, or a RAN device including a control plane CU node (CU-CP node), a user plane CU node (CU-UP node), and a DU node.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, a contact list, word processing software, and instant messaging software. In addition, a specific structure of an execution body of a method provided in the embodiments of this application is not particularly limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a functional module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk drive, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive).

In addition, various storage media described in this specification may indicate one or more devices and/or other machine-readable media that are configured to store information. The term "machine-readable media" may include but is not limited to a radio channel, and various other media that can store, include, and/or carry instructions and/or data.

For ease of understanding of the embodiments of this application, communication systems to which the embodiments of this application are applicable are described in detail with reference to FIG. 1 and FIG. 2.

FIG. 1 is a schematic diagram of a wireless communication system 100 to which an embodiment of this application is applicable. As shown in FIG. 1, the wireless communication system 100 may include at least one network device, for example, a network device 111 shown in FIG. 1. The wireless communication system 100 may further include at least one terminal device, for example, a terminal device 121 to a terminal device 123 shown in FIG. 1. A plurality of antennas may be configured for each of the network device and the terminal device. The network device and the terminal device may communicate with each other by using a multi-antenna technology.

When the network device communicates with the terminal device, the network device may manage one or more cells, and there may be an integer quantity of terminal devices in one cell. Optionally, the network device 111 and the terminal device 121 to the terminal device 123 form a single-cell communication system. Without loss of generality, a cell is denoted as a cell #1. The network device 111 may be a network device in the cell #1. In other words, the network device 111 may serve a terminal device (for example, the terminal device 121) in the cell #1.

It should be noted that a cell may be understood as an area within coverage of a radio signal of the network device.

Figure 2:
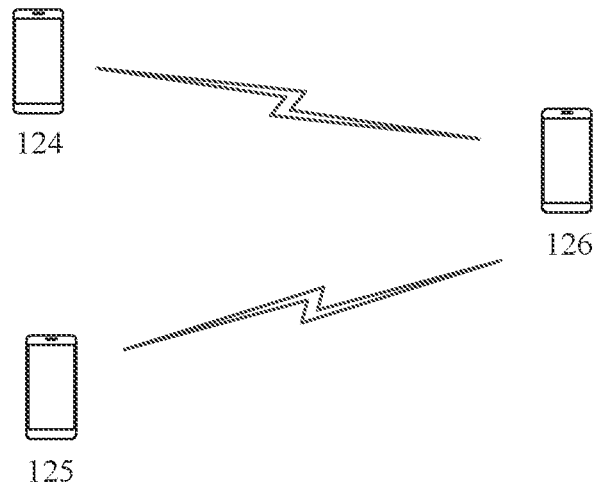

FIG. 2 is another schematic diagram of a wireless communication system 200 to which an embodiment of this application is applied. As shown in FIG. 2, the technical solutions of the embodiments of this application may be further applied to D2D communication. The wireless communication system 200 includes a plurality of terminal devices, for example, a terminal device 124 to a terminal device 126 in FIG. 2. The terminal device 124 to the terminal device 126 may directly communicate with each other. For example, the terminal device 124 and the terminal device 125 may separately or simultaneously send data to the terminal device 126.

It should be understood that FIG. 1 and FIG. 2 are merely examples for description, and this application is not limited thereto. For example, the embodiments of this application may be applied to any communication system, provided that there are at least two devices in the communication system. One device needs to send indication information to indicate a transmission direction, and another device receives the indication information, and may determine a transmission direction within a specific period of time based on the indication information.

For ease of understanding of the embodiments of this application, the following first briefly describes several terms in this application.

1. Precoding technology: When a channel state is known, the network device may process a to-be-sent signal by using a precoding matrix that matches the channel state, so that a precoded to-be-sent signal adapts to a channel, thereby reducing complexity of eliminating inter-channel impact by a receiving device. Therefore, after the to-be-sent signal is precoded, received signal quality (for example, a signal to interference plus noise ratio (signal to interference plus noise ratio, SINR)) is improved. A sending device and a plurality of receiving devices can implement transmission on a same time-frequency resource by using the precoding technology. That is, multi-user multiple-input multiple-output (multiple user multiple input multiple output, MU-MIMO) is implemented.

It should be understood that related descriptions of the precoding technology in this specification are merely examples for ease of understanding, and are not intended to limit the protection scope of the embodiments of this application. In a specific implementation process, the sending device may perform precoding in another manner. For example, when channel information (for example, but not limited to, a channel matrix) cannot be obtained, precoding is performed by using a preset precoding matrix or in a weighting processing manner. For brevity, specific content thereof is not described in the specification.

2. Channel reciprocity: In a time division duplex (time division duplexing, TDD) mode, on uplink and downlink channels, signals are transmitted on a same frequency domain resource and different time domain resources. Within relatively short time (for example, channel propagation coherence time), it may be considered that signals on the uplink and downlink channels experience same channel fading. This is reciprocity between the uplink and downlink channels. Based on the reciprocity between the uplink and downlink channels, the network device may measure the uplink channel based on an uplink reference signal, for example, a sounding reference signal (sounding reference signal, SRS), and may estimate the downlink channel based on the uplink channel, to determine a precoding matrix used for downlink transmission.

Uplink and downlink channels in a frequency division duplex (frequency division duplexing, FDD) mode have partial reciprocity, for example, angle reciprocity and delay reciprocity. In other words, delays and angles on the uplink and downlink channels in the FDD mode have reciprocity. Therefore, an angle and a delay may also be referred to as reciprocity parameters.

When a signal is transmitted through a radio channel, the signal may arrive at a receive antenna through a plurality of paths from a transmit antenna. A multipath delay causes frequency selective fading, that is, a change on a frequency domain channel. A delay is transmission time of a radio signal on different transmission paths, is determined by a distance and a speed, and is irrelevant to a frequency domain of the radio signal. When a signal is transmitted on different transmission paths, there are different transmission delays due to different distances. Therefore, delays on the uplink and downlink channels in the FDD mode may be considered to be the same, in other words, reciprocal.

In addition, an angle may be an angle of arrival (angle of arrival, AOA) at which a signal arrives at the receive antenna through a radio channel, or may be an angle of departure (angle of departure, AOD) at which a signal is transmitted by using the transmit antenna. In the embodiments of this application, the angle may be an angle of arrival at which an uplink signal arrives at the network device, or may be an angle of departure at which the network device transmits a downlink signal. The angle of arrival of the uplink reference signal and the angle of departure of the downlink reference signal may be considered to be the same, in other words, reciprocal. Therefore, there is angle reciprocity on the uplink and downlink channels in the FDD mode.

3. Reference signal (reference signal, RS): The reference signal may also be referred to as a pilot (pilot), a reference sequence, or the like. In the embodiments of this application, the reference signal may be a reference signal used for channel measurement. For example, the reference signal may be a channel state information reference signal (channel state information reference signal, CSI-RS) used for downlink channel measurement, or may be a sounding reference signal (sounding reference signal, SRS) used for uplink channel measurement. It should be understood that the reference signals listed above are merely examples, and this shall not constitute any limitation on this application. This application does not exclude a possibility that another reference signal is defined in a future protocol to implement a same or similar function.

A precoded reference signal may be a reference signal obtained by precoding the reference signal. The precoding may specifically include beamforming (beamforming) and/or phase rotation. Beamforming may be implemented, for example, by precoding a downlink reference signal based on one or more angle vectors, and phase rotation may be implemented, for example, by precoding a downlink reference signal based on one or more delay vectors.

In the embodiments of this application, for ease of distinguishing and description, a reference signal obtained through precoding, for example, beamforming and/or phase rotation, is referred to as a precoded reference signal; and a reference signal that is not precoded is referred to as a reference signal for short.

In the embodiments of this application, precoding the downlink reference signal based on the one or more angle vectors may also be referred to as loading the one or more angle vectors to the downlink reference signal to implement beamforming; precoding the downlink reference signal based on the one or more delay vectors may also be referred to as loading the one or more delay vectors to the downlink reference signal to implement phase rotation; and precoding the downlink reference signal based on the one or more delay vectors may also be referred to as loading the one or more relative delay vectors to the downlink reference signal to implement phase rotation. The relative delay is described in detail in the following embodiments.

4. Port (port): The port may be understood as a virtual antenna identified by the receiving device. In the embodiments of this application, the port may be a transmit antenna port. For example, a reference signal of each port may be a reference signal that is not precoded, or may be a precoded reference signal obtained by precoding a reference signal based on one delay vector. The port may alternatively be a port of a beamformed reference signal. For example, a reference signal of each port may be a precoded reference signal obtained by precoding a reference signal based on one angle vector, or may be a precoded reference signal obtained by precoding a reference signal based on one angle vector and one delay vector. The signal of each port may be transmitted by using one or more resource blocks (resource blocks, RBs).

The transmit antenna port may be an actually independent sending unit (transceiver unit, TxRU). It can be understood that, if space domain precoding is performed on a reference signal, a quantity of ports may be a quantity of reference signal ports, and the quantity of reference signal ports may be less than a quantity of transmit antenna ports.

In the following embodiments, when the transmit antenna port is involved, the quantity of transmit antenna ports may be a quantity of ports on which no space domain precoding is performed, that is, a quantity of actually independent sending units. When the port is involved, in different embodiments, the port may be a transmit antenna port, or may be a reference signal port. A specific meaning expressed by the port may be determined based on a specific embodiment.

5. Angle vector: The angle vector may be understood as a precoding vector used to perform beamforming on a reference signal. A transmitted reference signal may have specific spatial directivity through beamforming. Therefore, a process of precoding a reference signal based on an angle vector may also be considered as a space domain (or space domain for short) precoding process.

A quantity of ports of a precoded reference signal obtained by precoding a reference signal based on one or more angle vectors is the same as a quantity of the angle vectors.

Optionally, the angle vector is obtained from a discrete Fourier transform (Discrete Fourier Transform, DFT) matrix.

Because the reference signal to which the angle vector is loaded may be transmitted to the terminal device through a downlink channel, a channel measured by the terminal device based on the received precoded reference signal is equivalent to a channel to which the angle vector is loaded.

It should be understood that, the angle vector is a form that is proposed in this application and that is used to represent an angle. The angle vector is named only for ease of distinguishing from the delay, and this shall not constitute any limitation on this application. This application does not exclude a possibility of defining another name in a future protocol to represent a same or similar meaning.

6. Frequency domain unit: The frequency domain unit is a unit of a frequency domain resource, and may represent different frequency domain resource granularities. The frequency domain unit may include, for example, but not limited to, a subband (subband), a resource block (resource block, RB), a resource block group (resource block group, RBG), and a precoding resource block group (precoding resource block group, PRG).

In the embodiments of this application, the network device may determine, based on a feedback of the terminal device, a precoding matrix corresponding to each frequency domain unit.

7. Angle-delay pair: The angle-delay pair may be a combination of one angle vector and one delay vector. Each angle-delay pair may include one angle vector and one delay vector. Angle vectors and/or delay vectors included in any two angle-delay pairs are different. In other words, each angle-delay pair may be uniquely determined by one angle vector and one delay vector. It should be understood that, the angle-delay pair may be understood as a representation form of a spatial-frequency basic unit determined by using one angle vector and one delay vector, but the angle-delay pair may not necessarily be a unique representation form. For example, the angle-delay pair may be represented as a spatial-frequency component matrix, or a spatial-frequency component vector.

A spatial-frequency component matrix may be determined by using an angle-delay pair. In other words, a spatial-frequency component matrix may be uniquely determined by using one angle vector and one delay vector. A spatial-frequency component matrix and an angle-delay pair may be mutually converted. A spatial-frequency matrix may be an intermediate quantity used to determine the precoding matrix.

For the spatial-frequency component matrix, the spatial-frequency component vector, and the like, refer to descriptions in the conventional technology. This is not limited in the embodiments of this application.

8. Reference signal resource: The reference signal resource may be used to configure a transmission attribute of the reference signal, for example, a time-frequency resource position, a port mapping relationship, a power factor, and a scrambling code. For details, refer to the conventional technology. A transmit end device may send the reference signal based on the reference signal resource, and a receive end device may receive the reference signal based on the reference signal resource. One reference signal resource may include one or more RBs.

In the embodiments of this application, the reference signal resource may be, for example, a CSI-RS resource.

9. Pilot density: The pilot density is a ratio of a quantity of resource elements (resource elements, REs) occupied by a reference signal of each port, for example, a precoded reference signal in this application, to a total quantity of RBs in an occupied bandwidth. For example, if a pilot density of a reference signal of a port is 1, it may indicate that, in a bandwidth occupied by the reference signal of the port, each RB includes an RE used to carry the reference signal of the port. For another example, if a pilot density of a reference signal of a port is 0.5, it may indicate that, in a bandwidth occupied by the reference signal of the port, one RB in every two RBs includes an RE used to carry the reference signal of the port, in other words, there is one RB between adjacent RBs used to carry the reference signal of the port.

In a 5G communication system, a massive multi-antenna technology plays an important role in spectral efficiency of the system. When a MIMO technology is used, the network device needs to perform modulation and coding and signal precoding when the network device sends data to the terminal device. How the network device sends data to the terminal device depends on channel state information (channel state information, CSI) fed back by the terminal device to the network device. The channel state information greatly affects system performance.

In a TDD system, because an uplink channel and a downlink channel use a same bandwidth, and the uplink channel and the downlink channel have reciprocity, a network device side may obtain CSI of the downlink channel through the uplink channel based on the reciprocity between the uplink channel and the downlink channel, to perform signal precoding.

In an FDD system, a network device side may send information having reciprocity to a pilot by using FDD partial reciprocity, and a terminal device only needs to feed back information having no reciprocity (for example, information other than an angle and a delay). A network device can obtain complete CSI of a downlink channel by using information that has reciprocity and that is obtained through an uplink channel and with reference to the information that has no reciprocity and that is fed back by the terminal device.

The network device needs to estimate some prior information by using uplink channel information, including an angle and delay information of the uplink channel. The network device performs projection on a space-domain base (S) universal set or a frequency-domain base (F) universal set, to obtain a corresponding optimal angle and a corresponding delay estimation value $H_{UL}$. $H_{UL}$ represents a spatial-frequency matrix obtained through uplink channel measurement.

$H_{UL}$ may be expressed as: $H_{UL}=SC_{UL}F^H$.

S corresponds to space domain information, and physically corresponds to an angle of arrival/angle of departure of the network device. S may represent a matrix constructed by one or more angle vectors. F corresponds to frequency domain information, and physically corresponds to a multipath delay of a multipath signal that arrives at the network device. F may represent a matrix constructed by one or more delay vectors. C may represent a weighting coefficient corresponding to one angle vector and one delay vector. $C_{UL}$ represents a coefficient matrix of the uplink channel. A superscript H represents a conjugate transpose, for example, $F^H$ represents a conjugate transpose of a matrix (or a vector) F.

The network device loads an angle and a delay to a pilot, and the terminal device performs full-band superposition based on a received pilot signal, to obtain a superposition coefficient corresponding to an angle-delay pair.

Then, the uplink and the downlink are two independent links, and there may be a timing error of absolute time. When a timing error exists in the uplink and downlink channels, a shift deviation exists between the delay information estimated by using the uplink channel and actual delay information of the downlink channel. As a result, absolute positions of an uplink delay and a downlink delay may deviate.

In view of this, this application provides a method. A relative delay is indicated by using a feature that the relative delay is unrelated to absolute timing, to resolve a problem that a delay deviation is caused by an uplink and downlink timing error in a solution for performing channel measurement based on partial reciprocity.

The following describes in detail the embodiments provided in this application with reference to the accompanying drawings.

Figure 3:
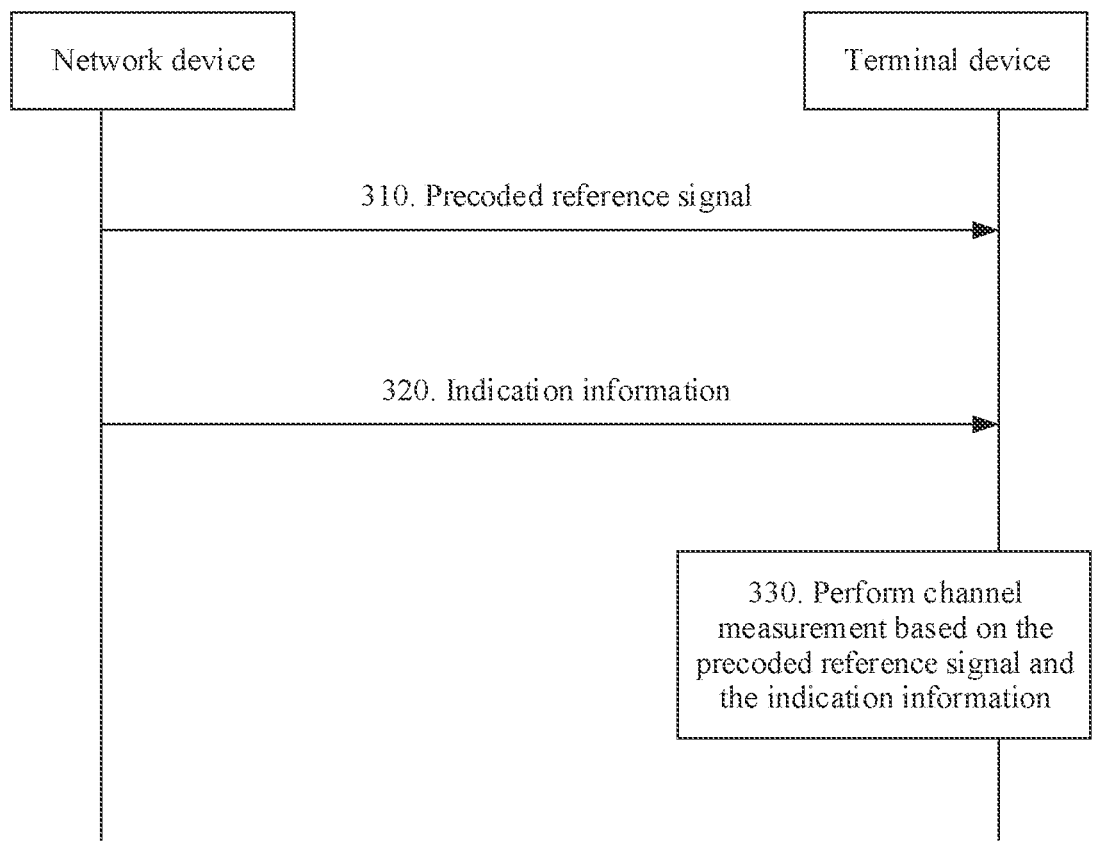
FIG. 3 is a schematic diagram of a channel measurement method according to an embodiment of this application.

FIG. 3 is a schematic interaction diagram of a channel measurement method 300 according to an embodiment of this application. The method 300 may include the following steps.

310. A terminal device receives a precoded reference signal.

Correspondingly, a network device sends the precoded reference signal.

The network device may precode a downlink reference signal based on information having reciprocity, and the information having reciprocity may be determined based on uplink channel measurement. For example, because of angle reciprocity and delay reciprocity on uplink and downlink channels, the network device may precode the downlink reference signal by using an angle vector and/or a delay vector determined based on the uplink channel measurement, so that the terminal device performs channel estimation based on the precoded reference signal.

It should be understood that other information having reciprocity may also be used in this embodiment of this application. The following mainly uses an angle and a delay as an example for description.

Optionally, in this embodiment of this application, the network device may precode the downlink reference signal by using the angle vector determined based on the uplink channel measurement.

The following uses K angle vectors as an example for description. K≥1, and K is an integer.

Optionally, the precoded reference signal is obtained by precoding a reference signal based on the K angle vectors.

The network device may precode the reference signal, for example, a CSI-RS, based on each of the K predetermined angle vectors, to obtain precoded reference signals corresponding to K ports. The precoded reference signal corresponding to each port may be obtained through precoding based on one of the K angle vectors.

Because of the angle reciprocity on the uplink and downlink channels, the K angle vectors may be determined based on uplink channel measurement. The network device may determine K stronger angles based on an uplink channel matrix obtained through pre-estimation. The K angles may be represented by using the K angle vectors.

For example, the K angle vectors may be obtained from a predefined angle vector set. Optionally, each angle vector in the angle vector set is obtained from a DFT matrix. Optionally, each angle vector in the angle vector set is a steering vector.

For example, the network device may determine the K angle vectors by using a joint angle and delay estimation (joint angle and delay estimation, JADE) algorithm in the conventional technology. Specifically, the estimation algorithm may be, for example, a multiple signal classification algorithm (multiple signal classification algorithm, MUSIC), a Bartlett (Bartlett) algorithm, or an estimation of signal parameters via rotational invariance techniques algorithm (estimation of signal parameters via rotation invariant technique algorithm, ESPRIT). Alternatively, the network device may determine the K angle vectors by performing DFT on a spatial-frequency matrix determined based on uplink channel measurement. A specific method in which the network device determines the K angle vectors is not limited in this application.

It should be understood that the K angle vectors are not necessarily determined based on uplink channel measurement. For example, the K angle vectors may be predefined, for example, defined in a protocol; or the K angle vectors may be determined by collecting statistics about results fed back based on one or more previous downlink channel measurements. A manner of determining the K angle vectors is not limited in this application.

In this embodiment of this application, the network device indicates information about a relative delay to the terminal device based on the delay vector determined through uplink channel measurement.

320: The network device sends indication information to the terminal device.

The indication information is used to indicate a relative delay between a first delay and a second delay, and the first delay and the second delay are determined through uplink channel measurement.

As described above, there are angle reciprocity and delay reciprocity on uplink and downlink channels in an FDD mode. The angle reciprocity may refer to reciprocity between an angle of arrival and an angle of departure of the network device. The delay reciprocity may refer to delay reciprocity between multipath delays. Different from angle information, an uplink and a downlink in the FDD mode are two independent links, and there may be a timing error of absolute time. As a result, absolute positions of uplink and downlink delays in FDD may deviate. Because of the delay reciprocity, the relative delay remains unchanged. Therefore, in this embodiment of this application, the network device may indicate, by using a feature that a relative delay is unrelated to absolute timing, information about the relative delay to the terminal device.

Optionally, the indication information may be carried in physical layer signaling. The physical layer signaling may include, for example, DCI.

When a delay changes quickly, the network device may include, for example, the indication information in DCI, so that the terminal device performs downlink channel measurement based on delay information obtained in the last measurement. Therefore, the terminal device can accurately feed back downlink channel information in time.

For example, the indication information may be jointly encoded with a channel state information (channel state information, CSI) request (CSI request), or may be separately encoded with a CSI request.

Optionally, the indication information is carried in higher layer signaling. The higher layer signaling may include, for example, a MAC CE or an RRC message.

When the delay changes slowly, the network device may include, for example, the indication information in the MAC CE or the RRC message. In this way, signaling overheads can be reduced.

It should be understood that the signaling that is listed above and that is used to carry the indication information is merely examples, and this shall not constitute any limitation on this application. This application does not exclude a possibility that the indication information is carried by using other signaling.

L delay vectors are used as an example. L≥2, and L is an integer. The first delay and the second delay may represent any two of the L delay vectors.

In this embodiment of this application, each angle may be represented by using one angle vector, and each delay may be represented by using one delay vector. Therefore, in this embodiment of this application, one angle vector may represent one angle, and one delay vector may represent one delay. In the following, the delay and the delay vector are sometimes used alternately, and the angle and the angle vector are sometimes used alternately.

The L delay vectors may be determined based on uplink channel measurement. Alternatively, the L delay vectors may not be determined based on uplink channel measurement. For example, the L delay vectors may be predefined, for example, defined in a protocol; or the L delay vectors may be determined by collecting statistics based on one or more previous downlink channel measurements. A manner of obtaining the L delay vectors is not limited in this application.

A quantity of delay vectors corresponding to one angle vector is not limited in this embodiment of this application.

For example, in a possible design, the L delay vectors correspond to each of the K angle vectors. In other words, any two of the K angle vectors may correspond to L same delay vectors.

For another example, in another possible design, one or more of the L delay vectors may correspond to one of the K angle vectors. In other words, delay vectors corresponding to at least two of the K angle vectors are different.

For example, in step 320, the network device may indicate a relative delay between the L delay vectors to the terminal device. The terminal device may determine the L delay vectors based on the relative delay between the L delay vectors.

It should be understood that, considering that a timing error of absolute time may exist on an uplink and a downlink, the L delay vectors determined by the terminal device may be different from the L delay vectors corresponding to the relative delay indicated by the network device.

The relative delay is described in detail in the following.

330. The terminal device performs channel measurement based on the precoded reference signal and the indication information.

The terminal device may determine, based on the indication information, a delay vector corresponding to each angle vector. For example, the terminal device determines each delay vector based on the relative delay.

Optionally, a delay corresponding to a port may be used as a reference delay, and the indication information may indicate relative delays between a plurality of delays and the reference delay. For example, the first delay is the reference delay, and the indication information may indicate relative delays between a plurality of delays and the first delay. For another example, the second delay is the reference delay, and the indication information may indicate relative delays between a plurality of delays and the second delay.

It should be understood that the reference delay, or referred to as a delay reference point or an absolute delay reference point, is merely a name for differentiation, and this does not constitute a limitation on the protection scope of the embodiments of this application. The reference delay is uniformly used for representation in the following.

For example, four delays are used as an example, and are respectively denoted as a delay 1, a delay 2, a delay 3, and a delay 4. Assuming that the delay 1 is the reference delay, a relative delay of the delay 2 relative to the delay 1 may be (a difference between the delay 2 and the delay 1); a relative delay of the delay 3 relative to the delay 1 may be (a difference between the delay 3 and the delay 1); and a relative delay of the delay 4 relative to the delay 1 may be (a difference between the delay 4 and the delay 1).

For example, the reference delay may be, for example, a delay zero point. There are at least two cases for the delay zero point.

In a possible case, the delay zero point represents a delay whose absolute delay is zero. In other words, the delay whose absolute delay is zero may be used as the reference delay.

Four delays are still used as an example. Assuming that an absolute delay of the delay 1 is zero, a relative delay of the delay 2 relative to the delay 1 may be a difference between the delay 2 and the delay 1, that is, the relative delay of the delay 2 relative to the delay 1 may be the delay 2; a relative delay of the delay 3 relative to the delay 1 may be a difference between the delay 3 and the delay 1, that is, the relative delay of the delay 3 relative to the delay 1 may be the delay 3; and a relative delay of the delay 4 relative to the delay 1 may be a difference between the delay 4 and the delay 1, that is, the relative delay of the delay 4 relative to the delay 1 may be the delay 4. The terminal device may determine a plurality of absolute delays based on the reference delay (for example, the delay 1 whose delay is zero) and the plurality of relative delays.

In another possible case, one of a plurality of delays may be set to zero, and the reference delay may be a relative delay between another delay and the delay. For example, it may be specified in advance, for example, it is specified in a protocol that one of a plurality of delays is zero, for example, the $1^{st}$ delay is zero. For example, if the $1^{st}$ delay is zero, it is considered that the $1^{st}$ delay is zero for the terminal device.

Four delays: a delay 1, a delay 2, a delay 3, and a delay 4 are still used as an example. It may be assumed that the delay 1 is zero. It should be understood that an absolute delay of the delay 1 may not be zero. In this case, relative delays that may be indicated by the network device to the terminal device include a relative delay of the delay 2 relative to the delay 1, a relative delay of the delay 3 relative to the delay 1, and a relative delay of the delay 4 relative to the delay 1. The relative delay of the delay 2 relative to the delay 1 may be a difference between the delay 2 and the delay 1 that is set to zero, that is, the relative delay of the delay 2 relative to the delay 1 may be the delay 2. The relative delay of the delay 3 relative to the delay 1 may be a difference between the delay 3 and the delay 1 that is set to zero, that is, the relative delay of the delay 3 relative to the delay 1 may be the delay 3. The relative delay of the delay 4 relative to the delay 1 may be a difference between the delay 4 and the delay 1 that is set to zero, that is, the relative delay of the delay 4 relative to the delay 1 may be the delay 4. The terminal device may determine a plurality of absolute delays based on the reference delay (for example, the delay 1 whose delay is set to zero, that is, the terminal device considers that the delay 1 is zero) and the plurality of relative delays.

It should be understood that setting the delay to zero means that one of a plurality of delays is considered to be zero. For example, the delay 1 is t1, the delay 2 is t2, the delay 3 is t3, and the delay 4 is t4. If the delay 1 is set to zero, the relative delays include the relative delay t2 of the delay 2 relative to the delay 1, the relative delay t3 of the delay 3 relative to the delay 1, and the relative delay t4 of the delay 4 relative to the delay 1. After the terminal device receives information indicating the relative delays, the terminal device may determine four absolute delays based on that the delay 1 being zero, the relative delay of the delay 2 relative to the delay 1 being t2, the relative delay of the delay 3 relative to the delay 1 being t3, and the relative delay of the delay 4 relative to the delay 1 being t4.

It should be understood that the foregoing is merely an example for description, and this embodiment of this application is not limited thereto. For example, one of the plurality of delays may be agreed as another number, and then the relative delay indicated by the network device to the terminal device may include a relative delay between another delay and the reference delay. The terminal device may determine a plurality of absolute delays based on the reference delay and the plurality of relative delays.

A person skilled in the art should understand a meaning of the reference delay. One of the plurality of delays is used as a reference delay, to determine a relative delay of another delay relative to the reference delay.

Optionally, the reference delay may be preset, or may be determined by the network device. This is not limited herein.

Figure 4:
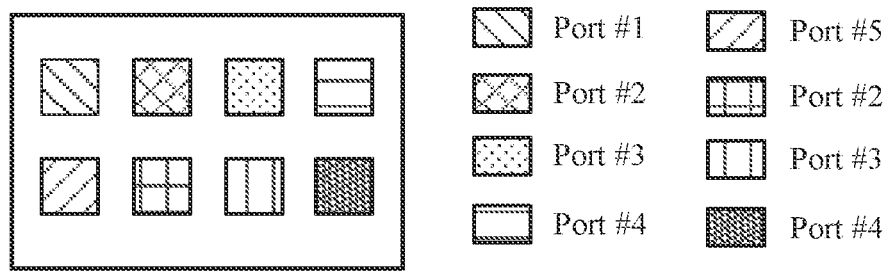
FIG. 4 is a schematic diagram of a channel measurement method applicable to an embodiment of this application.
Figure 5:
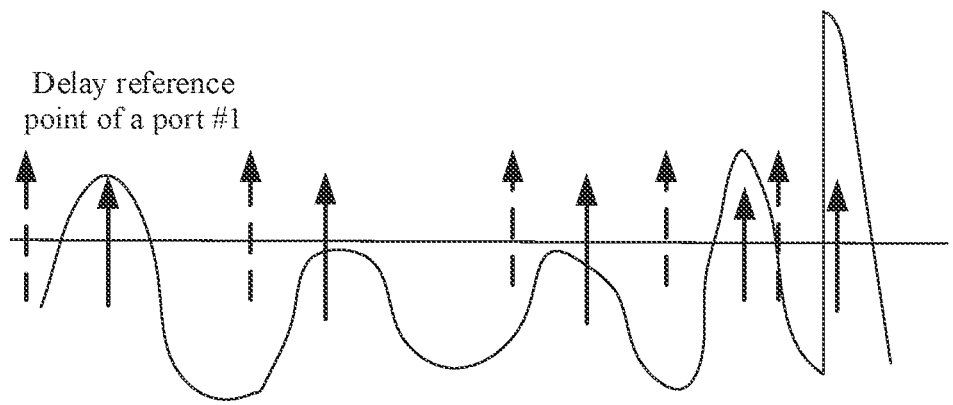
FIG. 5 and FIG. 6 are schematic diagrams of a channel measurement method applicable to an embodiment of this application.

With reference to FIG. 4 and FIG. 5, the following describes an example of a possible implementation in which the terminal device determines a delay vector.

FIG. 4 shows an example in which precoded reference signals of a plurality of ports are carried on RBs.

It should be understood that FIG. 4 is merely an example, to describe in detail a correspondence between a precoded reference signal carried on an RB and a port when an angle vector is loaded to a reference signal. It should be understood that the RB is merely a possible form of a frequency domain unit. The frequency domain unit may alternatively be, for example, a subband, a physical resource block (physical resource block, PRB), or an RBG. This is not limited in this application. The frequency domain unit in any form may include one or more RBs. In other words, the RB shown in FIG. 4 may be a frequency domain unit, or may be an RB that is in the frequency domain unit and that is used to carry a precoded reference signal. This is not limited in this application.

In addition, a quantity of RBs that is in each frequency domain unit and that is used to carry a precoded reference signal is not limited in this application either. For example, each frequency domain unit may include one RB used to carry a precoded reference signal, or may include a plurality of RBs used to carry a precoded reference signal. Regardless of a quantity of RBs for carrying a precoded reference signal in the frequency domain unit, a quantity of ports corresponding to a precoded reference signal carried on each RB remains unchanged. It may be understood that, when each frequency domain unit includes a plurality of RBs used to carry a precoded reference signal, angle-delay pairs corresponding to precoded reference signals carried on RBs in a same frequency domain unit may be the same or different. In other words, port numbers corresponding to precoded reference signals carried on RBs in a same frequency domain unit may be the same or different. This is not limited in this application.

FIG. 4 shows an example in which precoded reference signals of a plurality of ports are carried on RBs. In one RB shown in FIG. 4, precoded reference signals carried on the RB may correspond to eight ports, that is, K=8. The precoded reference signals of the eight ports may be obtained through precoding based on eight different angle vectors.

REs occupied by precoded reference signals of different ports in the RB may be different, for example, may be distinguished in a frequency division multiplexing (frequency division multiplexing, FDM) or time division multiplexing (time division multiplexing, TDM) manner. Alternatively, REs occupied by precoded reference signals of different ports in the RB may be the same, for example, may be distinguished in a code division multiplexing (code division multiplexing, CDM) manner. FIG. 4 is an example, and shows an example in which a port #1, a port #2, a port #3, and a port #4 are distinguished from a port #5, a port #6, a port #7, and a port #8 through FDM, and the port #1 and the port #5, the port #2 and the port #6, and the port #3 and the port #7 are distinguished from the port #4 and the port #8 through TDM.

It should be understood that FIG. 4 is merely an example for ease of understanding, and does not completely show all REs in one RB. A quantity of REs in the RB is not limited in this application. In addition, a quantity of ports corresponding to a precoded reference signal carried on the RB and a specific manner of resource multiplexing between reference signals of the ports are not limited in this application.

For example, for each port, there may be one reference delay. The terminal device may perform full-band DFT transform to obtain delay information corresponding to each port, as shown in FIG. 5.

The following uses the port #1 as an example for description.

The terminal device may obtain, based on a reference delay of the port #1 and relative delay information indicated by the network device, a relative relationship between all delays corresponding to the port #1, for example, a comb sampling point shown by a dashed-line arrow in FIG. 5. Then, the terminal device may perform joint detection by using a plurality of sampling points obtained by a horizontal shift, to detect a sampling point corresponding to a solid-line arrow in FIG. 5. Next, the terminal device may obtain delay information of a port corresponding to each angle vector.

After the terminal device receives a precoded reference signal from the network device, the terminal device may perform channel estimation on each RB. In addition, after the terminal device determines a delay vector corresponding to each angle vector, the terminal device may process a received estimated value of a downlink channel.

For example, the terminal device processes the received estimated value of the downlink channel, to determine angle-delay coefficients corresponding to a plurality of angle-delay pairs. In addition, the terminal device may feed back the angle-delay coefficients to the network device. The plurality of angle-delay pairs may be used to construct a precoding matrix that adapts to the downlink channel. The plurality of angle-delay pairs may be determined based on the K angle vectors described in step 320 and the L delay vectors determined by the terminal device. Each angle-delay pair includes one of the K angle vectors and one of the L delay vectors determined by the terminal device. Angle vectors and/or delay vectors included in any two angle-delay pairs are different.

How the terminal device performs channel measurement is not limited in this embodiment of this application.

The following describes in detail the relative delay from three aspects.

1. Form of the Relative Delay

The relative delay may represent a relative delay between a plurality of delays, and the plurality of delays may be determined based on the relative delay between the plurality of delays.

For example, for the relative delay between the plurality of delays, any one of the plurality of delays may be selected as a reference delay, to determine a relative delay between another delay in the plurality of delays and the reference delay.

The relative delay may be represented in at least any one of the following forms.

Form 1: The relative delay may be a relative delay between a plurality of delays corresponding to one port.

It may be understood that the relative delay may be a relative delay between delays corresponding to a same port.

For example, a first port is used as an example. The first port corresponds to a plurality of delays, the plurality of delays include a first delay and a second delay, and the relative delay may include a relative delay between the first delay and the second delay.

The first delay or the second delay may be a reference delay. The reference delay may be a delay zero point. As described above, in a possible case, the delay zero point represents a delay whose absolute delay is zero. In other words, the delay whose absolute delay is zero may be used as the reference delay. In another possible case, one of a plurality of delays may be set to zero, and the reference delay may be a relative delay between another delay and the delay. For example, it may be specified in advance, for example, it is specified in a protocol that the $1^{st}$ delay in the plurality of delays is zero.

It is assumed that the first delay is a reference delay. The relative delay may include a relative delay between delays other than the first delay in the plurality of delays corresponding to the first port and the first delay. The terminal device may determine information about the plurality of delays corresponding to the first port based on the relative delay.

The network device may precode a reference signal based on a first angle vector corresponding to the first port, to obtain a precoded reference signal, and send the precoded reference signal to the terminal device. After the terminal device receives the precoded reference signal from the network device, the terminal device may perform channel estimation. In addition, after the terminal device determines a delay vector corresponding to the first angle vector (that is, a delay vector corresponding to the first port), the terminal device may process a received estimated value of a downlink channel.

Form 2: The relative delay may be a delay between delays corresponding to ports.

It may be understood that the relative delay may be a relative delay between delays corresponding to different ports.

For example, the first delay corresponds to a second port, the second delay corresponds to a third port, and the relative delay may include a relative delay between the first delay and the second delay.

The first delay or the second delay may be a reference delay. The reference delay may be a delay zero point. As described above, in a possible case, the delay zero point represents a delay whose absolute delay is zero. In other words, the delay whose absolute delay is zero may be used as the reference delay. In another possible case, one of a plurality of delays may be set to zero, and the reference delay may be a relative delay between another delay and the delay. For example, it may be specified in advance, for example, it is specified in a protocol that one of a plurality of delays is zero, for example, the $1^{st}$ delay is zero.

It is assumed that the first delay is a reference delay. The relative delay may include a relative delay between the second delay and the first delay. The terminal device may determine delay information corresponding to the second port based on the relative delay.

The network device may precode a reference signal based on a second angle vector corresponding to the second port and a third angle vector corresponding to the third port, to obtain a precoded reference signal, and send the precoded reference signal to the terminal device. After the terminal device receives the precoded reference signal from the network device, the terminal device may perform channel estimation. In addition, after the terminal device determines a delay vector corresponding to the second angle vector (that is, a delay vector corresponding to the second port) and a delay vector corresponding to the third angle vector (that is, a delay vector corresponding to the third port), the terminal device may process a received estimated value of a downlink channel.

The following describes in detail the foregoing two forms.

Form 1: The relative delay may be a relative delay between a plurality of delays corresponding to one port.

The terminal device may determine, based on the relative delay between the plurality of delays corresponding to the port, information about the plurality of delays corresponding to the port.

Four delays are used as an example, and are respectively denoted as a delay 1, a delay 2, a delay 3, and a delay 4. The four delays correspond to one port.

Figure 6:
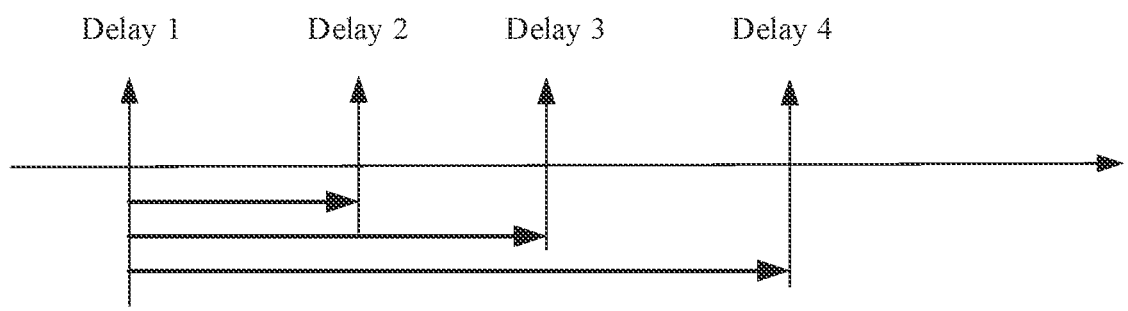

For example, the delay 1 is used as a reference delay, as shown in FIG. 6.

The relative delays indicated by the network device to the terminal device may include a relative delay of the delay 2 relative to the delay 1, a relative delay of the delay 3 relative to the delay 1, and a relative delay of the delay 4 relative to the delay 1.

The terminal device may determine delay information corresponding to the port based on the relative delay between the plurality of delays corresponding to the port. For example, the terminal device may determine information about the delay 2 based on the relative delay of the delay 2 relative to the delay 1. For another example, the terminal device may determine information about the delay 3 based on the relative delay of the delay 3 relative to the delay 1. For another example, the terminal device may determine information about the delay 4 based on the relative delay of the delay 4 relative to the delay 1.

It should be understood that, the terminal device may determine the information about the delay 2 based on the relative delay of the delay 2 relative to the delay 1, the terminal device may determine the information about the delay 3 based on the relative delay of the delay 3 relative to the delay 1, or the terminal device may determine the information about the delay 4 based on the relative delay 4 relative to the delay 1. All the foregoing descriptions are used to indicate that the terminal device may determine information about one absolute delay based on the relative delay. In other words, the terminal device may determine, based on the plurality of relative delays, for example, the relative delay of the delay 2 relative to the delay 1, the relative delay of the delay 3 relative to the delay 1, and the relative delay of the delay 4 relative to the delay 1, information about a plurality of delays corresponding to the port, or information about a plurality of absolute delays corresponding to the port. In other words, in this embodiment of this application, the terminal device may determine one absolute delay based on one relative delay.

It should be further understood that the foregoing is merely an example for description, and this embodiment of this application is not limited thereto, provided that the relative delay between the plurality of delays is indicated, and each delay can be determined based on the relative delay. For example, the relative delays indicated by the network device to the terminal device may include the relative delay of the delay 2 relative to the delay 1, a relative delay of the delay 3 relative to the delay 2, and a relative delay of the delay 4 relative to the delay 3. The terminal device may also determine delay information corresponding to the first port based on the relative delays.

It should be further understood that the foregoing Form 1 is merely a possible form, and this embodiment of this application is not limited thereto. For example, the relative delay may alternatively be a relative delay between a plurality of delays corresponding to one angle vector.

A reference signal of each port may be a precoded reference signal obtained by precoding a reference signal based on one angle vector. It may be understood that each port corresponds to one angle vector.

Four delays are used as an example, and are respectively denoted as a delay 1, a delay 2, a delay 3, and a delay 4. The four delays correspond to one angle vector.

For example, the delay 1 is used as a reference delay, as shown in FIG. 6.

The relative delays indicated by the network device to the terminal device may include a relative delay of the delay 2 relative to the delay 1, a relative delay of the delay 3 relative to the delay 1, and a relative delay of the delay 4 relative to the delay 1.

The terminal device may determine delay information corresponding to the angle vector based on the relative delay between the plurality of delays corresponding to the angle vector. For example, the terminal device may determine information about the delay 2 based on the relative delay of the delay 2 relative to the delay 1. For another example, the terminal device may determine information about the delay 3 based on the relative delay of the delay 3 relative to the delay 1. For another example, the terminal device may determine information about the delay 4 based on the relative delay of the delay 4 relative to the delay 1.

Form 2: The relative delay may be a delay between delays corresponding to ports.

The terminal device may determine, based on a relative delay between delays corresponding to ports, delay information corresponding to each port.

Four delays are used as an example, and are respectively denoted as a delay 1, a delay 2, a delay 3, and a delay 4.

In a possible assumption, the delay 1 corresponds to a port 1, the delay 2 corresponds to a port 2, the delay 3 corresponds to a port 3, and the delay 4 corresponds to a port 4.

For example, the delay 1 is used as a reference delay, as shown in FIG. 6.

The relative delays indicated by the network device to the terminal device may include a relative delay of the delay 2 relative to the delay 1, a relative delay of the delay 3 relative to the delay 1, and a relative delay of the delay 4 relative to the delay 1.

The terminal device may determine, based on the relative delay between the delays corresponding to the ports, the delay information corresponding to each port. For example, the terminal device may determine, based on the relative delay of the delay 2 relative to the delay 1, delay information corresponding to the port 2, that is, information about the delay 2. For another example, the terminal device may determine, based on the relative delay of the delay 3 relative to the delay 1, delay information corresponding to the port 3, that is, information about the delay 3. For another example, the terminal device may determine, based on the relative delay of the delay 4 relative to the delay 1, delay information corresponding to the port 4, that is, information about the delay 4.

It should be understood that the foregoing is merely an example for description, and this embodiment of this application is not limited thereto, provided that the relative delay between the plurality of delays is indicated, and each delay can be determined based on the relative delay. For example, the relative delays indicated by the network device to the terminal device may include the relative delay of the delay 2 relative to the delay 1, a relative delay of the delay 3 relative to the delay 2, and a relative delay of the delay 4 relative to the delay 3.

In another possible assumption, the delay 1 and the delay 2 correspond to a port 1, and the delay 3 and the delay 4 correspond to a port 2.

For example, the delay 1 is used as a reference delay, as shown in FIG. 6.

The relative delays indicated by the network device to the terminal device may include a relative delay of the delay 2 relative to the delay 1, a relative delay of the delay 3 relative to the delay 1, and a relative delay of the delay 4 relative to the delay 1.

The terminal device may determine, based on the relative delay between the delays corresponding to the ports, the delay information corresponding to each port. For example, the terminal device may determine, based on the relative delay of the delay 2 relative to the delay 1, delay information corresponding to the port 1, that is, information about the delay 2. For another example, the terminal device may determine, based on the relative delay of the delay 3 relative to the delay 1, and based on the relative delay of the delay 4 relative to the delay 1, delay information corresponding to the port 2, that is, information about the delay 3 and the delay 4.

It should be understood that the foregoing two assumptions are merely examples for descriptions, and a quantity of delays corresponding to a port is not limited in this embodiment of this application. For example, the port may alternatively correspond to a larger quantity of delays.

In Form 2, a delay may be selected from a plurality of delays corresponding to a plurality of ports as a reference delay, and then the network device may indicate relative delays of the plurality of delays relative to the reference delay to the terminal device. The terminal device may determine, based on the relative delays, delay information corresponding to the plurality of ports.

It should be understood that the foregoing Form 2 is merely a possible form, and this embodiment of this application is not limited thereto. For example, the relative delay may alternatively be a relative delay between a plurality of delays corresponding to a plurality of angle vectors.

A reference signal of each port may be a precoded reference signal obtained by precoding a reference signal based on one angle vector. It may be understood that each port corresponds to one angle vector.

Four delays are used as an example, and are respectively denoted as a delay 1, a delay 2, a delay 3, and a delay 4. It is assumed that the delay 1 corresponds to an angle vector 1, the delay 2 corresponds to an angle vector 2, the delay 3 corresponds to an angle vector 3, and the delay 4 corresponds to an angle vector 4.

For example, the delay 1 is used as a reference delay, as shown in FIG. 6.

The relative delays indicated by the network device to the terminal device may include a relative delay of the delay 2 relative to the delay 1, a relative delay of the delay 3 relative to the delay 1, and a relative delay of the delay 4 relative to the delay 1.

The terminal device may determine, based on the relative delay between the delays corresponding to the angle vectors, delay information corresponding to each angle vector. For example, the terminal device may determine, based on the relative delay of the delay 2 relative to the delay 1, delay information corresponding to the angle vector 2, that is, information about the delay 2. For another example, the terminal device may determine, based on the relative delay of the delay 3 relative to the delay 1, delay information corresponding to the angle vector 3, that is, information about the delay 3. For another example, the terminal device may determine, based on the relative delay of the delay 4 relative to the delay 1, delay information corresponding to the angle vector 4, that is, information about the delay 4.

The possible forms of the relative delay are listed as examples with reference to Form 1 and Form 2. This embodiment of this application is not limited to the foregoing two forms, and any form in which a relative delay between a plurality of delays can be indicated falls within the protection scope of the embodiments of this application.

The following describes indication solutions of the relative delay for a plurality of ports.

2. Indication Solutions of the Relative Delay for a Plurality of Ports

In the embodiments of this application, for the plurality of ports, there may be at least two solutions for indicating the relative delay.

Solution 1: For each port, relative delays are independently indicated.

Solution 2: For all ports, relative delays are indicated together.

The following describes in detail the foregoing two solutions.

Solution 1: For each port, relative delays are independently indicated.

In other words, for each port, information about the relative delays is independently indicated. In other words, for each port, the network device indicates information about the relative delays corresponding to the port to the terminal device.

For example, relative delays of the port 1 and the port 2 are indicated.

In a possible design, the network device sends first information to the terminal device, where the first information is used to indicate a relative delay between a plurality of delays of the port 1. The network device sends second information to the terminal device, where the second information is used to indicate a relative delay between a plurality of delays of the port 2.

The first information and the second information may be carried in different fields in same signaling, or the first information and the second information may be sent to the terminal device by using different signaling.

A reference signal of each port may be a precoded reference signal obtained by precoding a reference signal based on one angle vector. It may be understood that each port corresponds to one angle vector. Therefore, indication for each port may also be understood as indication for each angle vector. In other words, for each angle vector, information about a relative delay corresponding to the angle vector is independently indicated.

For example, in Solution 1, a form of the relative delay may be the foregoing Form 1.

Solution 2: For all ports, relative delays are indicated together.

It may be understood that a plurality of ports share one reference delay.

That is, one delay is selected from delays corresponding to a plurality of ports as a reference delay, and the relative delay includes a relative delay between the delays corresponding to the plurality of ports and the reference delay.

For example, relative delays of the port 1 and the port 2 are indicated. It is assumed that the port 1 corresponds to A delays, the port 2 corresponds to B delays, and A and B are positive integers. It is assumed that one of the A delays is a reference delay.

In a possible design, the network device sends third information to the terminal device, where the third information is used to indicate a relative delay between delays other than the reference delay in the A delays and the reference delay, and a relative delay between the B delays and the reference delay.

A reference signal of each port may be a precoded reference signal obtained by precoding a reference signal based on one angle vector. It may be understood that each port corresponds to one angle vector. Therefore, that a plurality of ports share one reference delay may also be understood as that a plurality of angle vectors share one reference delay.

For example, in Solution 2, a form of the relative delay may be the foregoing Form 1 or Form 2.

It should be understood that the foregoing two solutions are merely examples for description, and this embodiment of this application is not limited thereto. For example, the foregoing Solution 1 and Solution 2 may be used separately, or may be used in combination. For example, separate indication is performed for some ports, and overall indication is performed for some ports.

It should be further understood that the terminal device may determine, based on the manner described in step 330, a delay corresponding to each port.

The following describes indication solutions of the relative delay for a plurality of ports.

It is assumed that the network device indicates a relative delay between L delays. For example, information about L−1 relative delays may be obtained. The following describes in detail how the network device determines L−1 relative delays.

3. Manner in which the Network Device Determines the L−1 Relative Delays

Optionally, the L delay vectors are selected from N delay vectors. N is an integer greater than or equal to 2. The relative delays may be relative delays between a first delay vector in the L delay vectors and other delay vectors. The network device may indicate L−1 relative delay vectors to the terminal device.

It should be understood that a specific implementation in which the network device determines the L delay vectors is not limited in this application.

The first delay vector is any one of the L delay vectors. For example, it may be assumed that the first delay vector may be a reference delay, for example, the delay is zero.

For example, a subscript of a DFT vector (a length is N) is encoded to indicate a relative delay vector.

For example, DFT is performed on a spatial-frequency matrix $H_{UL}$ of an uplink channel. It is assumed that the delay vector is obtained from a DFT matrix. The network device may perform space domain and frequency domain DFT on the uplink channel $H_{UL}$ to obtain a coefficient matrix $C_{UL}$, and may determine L stronger columns from the coefficient matrix $C_{UL}$. The network device may determine, based on a quadratic sum of moduli of elements in each row in the coefficient matrix $C_{UL}$, L columns with larger quadratic sums of the moduli. The L columns with the larger quadratic sums of the moduli may be used to determine the L delay vectors. Any one of the L delay vectors is selected as a reference delay, and positions of the remaining L−1 columns in the coefficient matrix $C_{UL}$ may be positions of L−1 relative delay vectors in a relative delay vector set. For example, column sequence numbers of the L−1 columns in the coefficient matrix $C_{UL}$ may be column sequence numbers of the L−1 relative delay vectors in the relative delay vector set. Therefore, the L−1 relative delay vectors may be determined. The L−1 relative delay vectors are relative delay vectors selected from the set.

If a conventional indication manner is used, for example, the L delay vectors are indicated from the N delay vectors, signaling indicating a delay may be $\lceil \log C_N^L \rceil$. ⌈ ⌉ represents a ceiling operation. Based on this embodiment of this application, for example, if the L delay vectors are indicated from the N delay vectors, and relative delay vectors of the L delay vectors are indicated, that is, the L−1 relative delay vectors are indicated, signaling indicating a delay may be $\lceil \log C_N^{L-1} \rceil$, or based on this embodiment of this application, signaling indicating a delay may be $\lceil \log C_{N-1}^{L-1} \rceil$. Based on this embodiment of this application, delay indication overheads can be reduced.

In another example, the relative delay may also be jointly indicated by using an angle and a delay.

Three-dimensional DFT (N1, N2, Nf) subscripts for the angle and the delay are encoded and used to indicate the angle and a delay, and L−1 relative delays are selected from N1N2Nf−1.

N1 is a space domain dimension, N2 is another space domain dimension, N1N2 is used to indicate an angle position, and Nf is a delay domain dimension and corresponds to a delay position.

For example, a delay of a port may be predefined as a reference delay. For example, a delay of a port is considered by default in a protocol as a reference delay.

It should be understood that how the network device determines a relative delay or indicates a relative delay is not limited in the embodiments of this application. Any manner in which the relative delay can be determined or the relative delay can be indicated falls within the protection scope of the embodiments of this application.

Based on the embodiments of this application, a port for sending a pilot in a downlink is used as a reference delay, or a delay of a pilot port is used as a reference delay, and a relative delay is indicated by using downlink signaling. The terminal device may determine a position of a downlink delay through joint detection, which can not only resolve a problem of a delay deviation caused by an uplink and downlink timing error, but also reduce signaling overheads caused by indicating delays.

The embodiments described in this specification may be independent solutions, or may be combined based on internal logic. These solutions all fall within the protection scope of this application.

It may be understood that, in the foregoing method embodiments, the methods and the operations implemented by the terminal device may alternatively be implemented by a component (for example, a chip or a circuit) that can be used in the terminal device, and the methods and the operations implemented by the network device may alternatively be implemented by a component (for example, a chip or a circuit) that can be used in the network device.

The foregoing describes in detail the methods provided in the embodiments of this application with reference to FIG. 3 to FIG. 6. The following describes in detail communication apparatuses provided in the embodiments of this application with reference to FIG. 7 to FIG. 10. It should be understood that descriptions of the apparatus embodiments correspond to the descriptions of the method embodiments. Therefore, for content not described in detail, refer to the foregoing method embodiments. For brevity, details are not described herein again.

The foregoing mainly describes the solutions provided in the embodiments of this application from a perspective of interaction between network elements. It may be understood that, to implement the foregoing functions, each network element, such as a transmit-end device or a receive-end device, includes a corresponding hardware structure and/or software module for performing each function. A person skilled in the art may be aware that, with reference to the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In the embodiments of this application, functional modules of the transmit-end device or the receive-end device may be obtained through division based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is merely logical function division, and may be other division during actual implementation. An example in which each functional module is obtained through division based on each corresponding function is used below for description.

Figure 7:
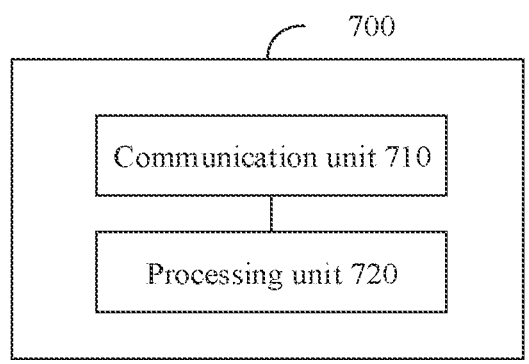
FIG. 7 is a schematic block diagram of a communication apparatus according to an embodiment of this application.

FIG. 7 is a schematic block diagram of a communication apparatus according to an embodiment of this application. As shown in the figure, the communication apparatus 700 may include a communication unit 710 and a processing unit 720. The communication unit 710 may communicate with the outside, and the processing unit 720 is configured to process data. The communication unit 710 may also be referred to as a communication interface or a transceiver unit. The communication interface is configured to input and/or output information. The information includes at least one of the instructions and data. Optionally, the communication apparatus may be a chip or a chip system. When the communication apparatus is a chip or a chip system, the communication interface may be an input/output interface, or may be an input/output interface, an interface circuit, an output circuit, an input circuit, a pin, a related circuit, or the like on the chip or the chip system. The processor may alternatively be embodied as a processing circuit or a logic circuit.

In a possible design, the communication apparatus 700 may implement a step or a procedure performed by the terminal device in the foregoing method embodiments, for example, may be the terminal device, or a chip, a chip system, or a circuit disposed in the terminal device. In this case, the communication apparatus 700 may be referred to as a terminal device. The communication unit 710 is configured to perform a sending/receiving-related operation on a terminal device side in the foregoing method embodiments, and the processing unit 720 is configured to perform a processing-related operation of the terminal device in the foregoing method embodiments.

In a possible implementation, the communication unit 710 is configured to receive a precoded reference signal and indication information, where the indication information is used to indicate a relative delay between a first delay and a second delay, and the first delay and the second delay are determined through uplink channel measurement. The processing unit 720 is configured to perform channel measurement based on the precoded reference signal and the indication information.

Optionally, the precoded reference signal corresponds to one or more ports, and the one or more ports include a first port; and the first delay and the second delay correspond to the first port.

Optionally, the precoded reference signal is obtained by precoding a reference signal based on a first angle vector corresponding to the first port.

Optionally, the precoded reference signal corresponds to one or more ports, and the one or more ports include a second port and a third port; and the first delay corresponds to the second port, and the second delay corresponds to the third port.

Optionally, the precoded reference signal is obtained by precoding a reference signal based on a second angle vector corresponding to the second port and a third angle vector corresponding to the third port.

Optionally, that the indication information is used to indicate a relative delay between a first delay and a second delay includes: The indication information is used to indicate a relative delay of a plurality of ports, and the relative delay of the plurality of ports includes the relative delay between the first delay and the second delay.

Optionally, a plurality of ports correspond to a same reference delay.

Optionally, that the indication information is used to indicate a relative delay between a first delay and a second delay includes: The indication information is used to indicate a relative delay of a fourth port, and the relative delay of the fourth port includes the relative delay between the first delay and the second delay.

Optionally, the first delay or the second delay is a reference delay.

The communication apparatus 700 may implement a step or a procedure performed by the terminal device in the method 300 in the embodiments of this application, and the communication apparatus 700 may include a unit configured to perform the method performed by the terminal device in the method 300 in FIG. 3. In addition, each unit in the communication apparatus 700 and the foregoing other operations and/or functions are separately used to implement corresponding procedures of the method 300 in FIG. 3.

When the communication apparatus 700 is configured to perform the method 300 in FIG. 3, the communication unit 710 may be configured to perform step 310 and step 320 in the method 300, and the processing unit 720 may be configured to perform step 330 in the method 300.

It should be understood that, a specific process in which each unit performs the foregoing corresponding step has been described in detail in the foregoing method embodiments. For brevity, details are not described herein again.

Figure 9:
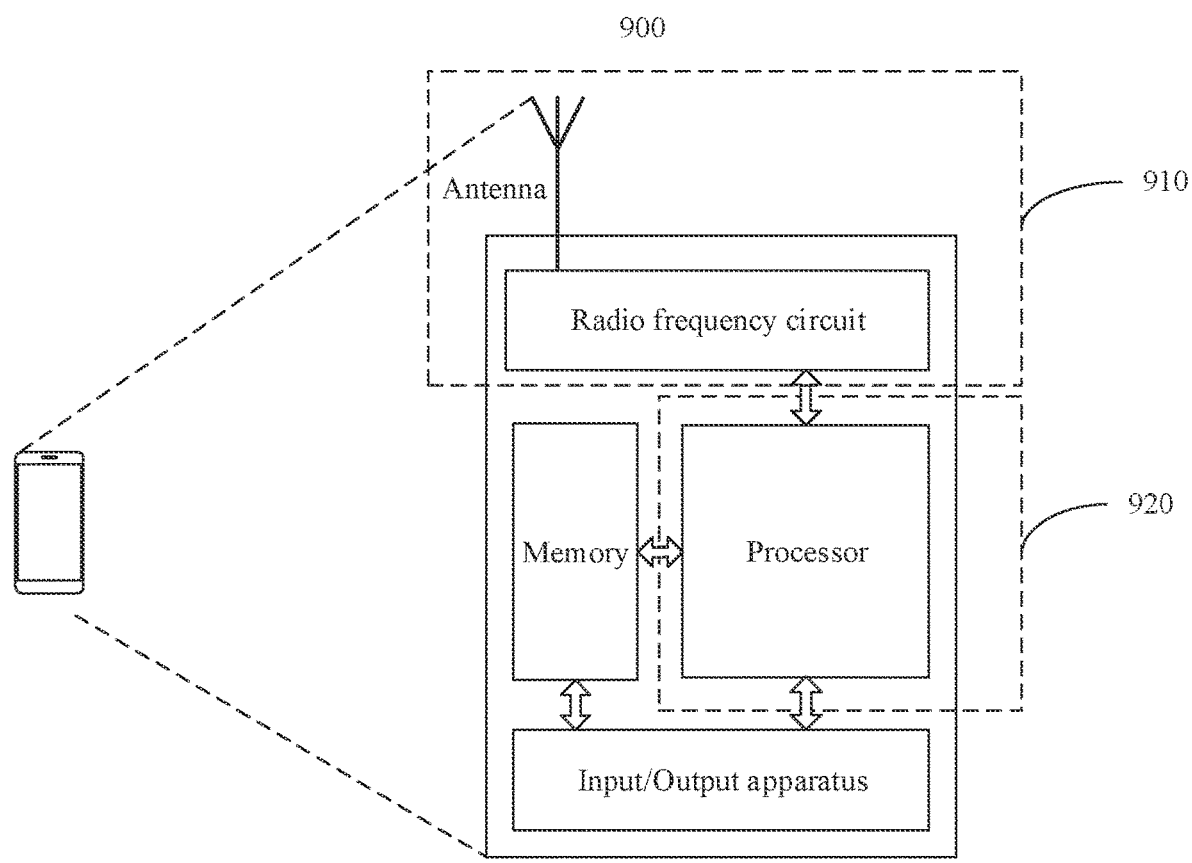
FIG. 9 is a schematic diagram of a structure of a terminal device according to an embodiment of this application.

It should be further understood that the communication unit 710 in the communication apparatus 700 may be implemented by using a transceiver unit 910 in a communication apparatus 900 shown in FIG. 9, and the processing unit 720 in the communication apparatus 700 may be implemented by using a processing unit 920 in the communication apparatus 900 shown in FIG. 9. The transceiver unit may include a transmitter and/or a receiver, to respectively implement functions of a sending unit and a receiving unit.

It should be further understood that the communication unit 710 in the communication apparatus 700 may alternatively be an input/output interface.

In another possible design, the communication apparatus 700 may implement a step or a procedure performed by the network device in the foregoing method embodiments, for example, may be the network device, or a chip, a chip system, or a circuit disposed in the network device. In this case, the communication apparatus 700 may be referred to as a network device. The communication unit 710 is configured to perform a sending/receiving-related operation on a network device side in the foregoing method embodiments, and the processing unit 720 is configured to perform a processing-related operation of the network device in the foregoing method embodiments.

In a possible implementation, the processing unit 720 is configured to generate a precoded reference signal, and the communication unit 710 is configured to send the precoded reference signal and indication information, where the indication information is used to indicate a relative delay between a first delay and a second delay, and the first delay and the second delay are determined through uplink channel measurement.

Optionally, the precoded reference signal corresponds to one or more ports, and the one or more ports include a first port; and the first delay and the second delay correspond to the first port.

Optionally, the processing unit 720 is specifically configured to precode a reference signal based on a first angle vector corresponding to the first port, to obtain the precoded reference signal.

Optionally, the precoded reference signal corresponds to one or more ports, and the one or more ports include a second port and a third port; and the first delay corresponds to the second port, and the second delay corresponds to the third port.

Optionally, the processing unit 720 is configured to precode a reference signal based on a second angle vector corresponding to the second port and a third angle vector corresponding to the third port, to obtain the precoded reference signal, where the second angle vector corresponds to the first delay, and the third angle vector corresponds to the second delay.

Optionally, that the indication information is used to indicate a relative delay between a first delay and a second delay includes: The indication information is used to indicate a relative delay of a plurality of ports, and the relative delay of the plurality of ports includes the relative delay between the first delay and the second delay.

Optionally, a plurality of ports correspond to a same reference delay.

Optionally, that the indication information is used to indicate a relative delay between a first delay and a second delay includes: The indication information is used to indicate a relative delay of a fourth port, and the relative delay of the fourth port includes the relative delay between the first delay and the second delay.

Optionally, the first delay or the second delay is a reference delay.

The communication apparatus 700 may implement a step or a procedure performed by the network device in the method 300 in the embodiments of this application, and the communication apparatus 700 may include a unit configured to perform the method performed by the network device in the method 300 in FIG. 3. In addition, each unit in the communication apparatus 700 and the foregoing other operations and/or functions are separately used to implement corresponding procedures of the method 300 in FIG. 3.

When the communication apparatus 700 is configured to perform the method 300 in FIG. 3, the communication unit 710 may be configured to perform step 310 and step 320 in the method 300.

It should be understood that, a specific process in which each unit performs the foregoing corresponding step has been described in detail in the foregoing method embodiments. For brevity, details are not described herein again.

Figure 10:
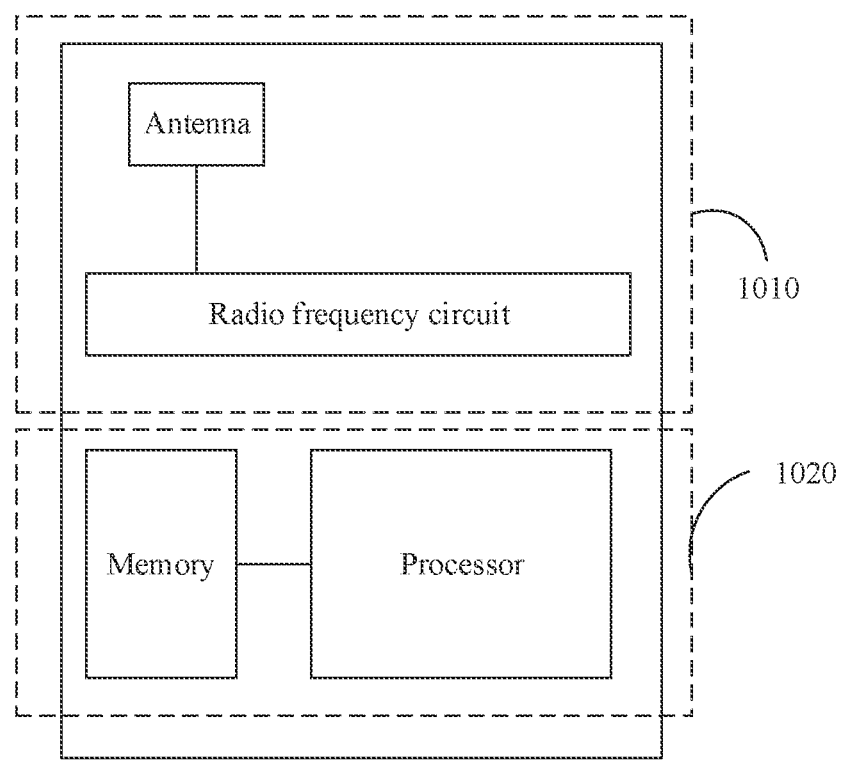
FIG. 10 is a schematic diagram of a structure of a network device according to an embodiment of this application.

It should be further understood that the communication unit in the communication apparatus 700 may be implemented by using a transceiver 1010 in a communication apparatus 1000 shown in FIG. 10, and the processing unit 720 in the communication apparatus 700 may be implemented by using a processor 1020 in the communication apparatus 1000 shown in FIG. 10.

It should be further understood that the communication unit 710 in the communication apparatus 700 may alternatively be an input/output interface. The transceiver may include a transmitter and/or a receiver, to respectively implement functions of a sending unit and a receiving unit.

Figure 8:
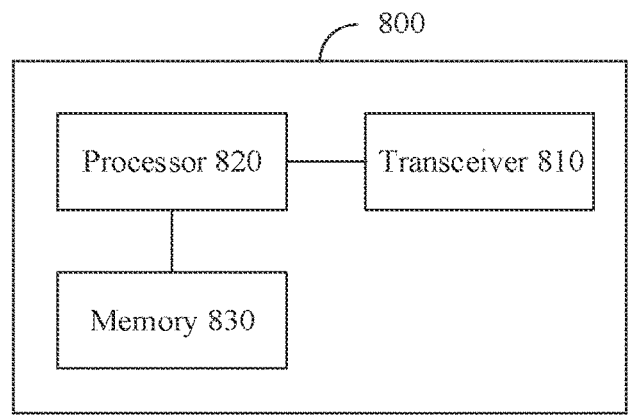
FIG. 8 is another schematic block diagram of a communication apparatus according to an embodiment of this application.

FIG. 8 is another schematic block diagram of a communication apparatus 800 according to an embodiment of this application. As shown in the figure, the communication apparatus 800 includes a transceiver 810, a processor 820, and a memory 830. The memory 830 stores a program. The processor 820 is configured to execute the program stored in the memory 830. Execution of the program stored in the memory 830 enables the processor 820 to perform a processing-related step in the foregoing method embodiments, and enables the processor 820 to control the transceiver 810 to perform a receiving/sending-related step in the foregoing method embodiments.

In an implementation, the communication apparatus 800 is configured to perform an action performed by the terminal device in the foregoing method embodiments. In this case, the execution of the program stored in the memory 830 enables the processor 820 to perform a processing step on a terminal device side in the foregoing method embodiments, and enables the processor 820 to control the transceiver 810 to perform receiving and sending steps on the terminal device side in the foregoing method embodiments.

In another implementation, the communication apparatus 800 is configured to perform an action performed by the network device in the foregoing method embodiments. In this case, the execution of the program stored in the memory 830 enables the processor 820 to perform a processing step on network device side in the foregoing method embodiments, and enables the processor 820 to control the transceiver 810 to perform receiving and sending steps on the network device side in the foregoing method embodiments.

An embodiment of this application further provides a communication apparatus 900. The communication apparatus 900 may be a terminal device or a chip. The communication apparatus 900 may be configured to perform an action performed by the terminal device in the foregoing method embodiments.

When the communication apparatus 900 is a terminal device, FIG. 9 is a simplified schematic diagram of a structure of the terminal device. As shown in FIG. 9, the terminal device includes a processor, a memory, a radio frequency circuit, an antenna, and an input/output apparatus. The processor is mainly configured to process a communication protocol and communication data, control the terminal device, execute a software program, process data of the software program, and so on. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display screen, or a keyboard, is mainly configured to receive data entered by a user and output data to the user. It should be noted that some types of terminal devices may have no input/output apparatus.

When data needs to be sent, the processor performs baseband processing on the to-be-sent data, and outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device.

As shown in FIG. 9, the terminal device includes a transceiver unit 910 and a processing unit 920. The transceiver unit 910 may also be referred to as a transceiver, a transceiver machine, a transceiver apparatus, or the like. The processing unit 920 may also be referred to as a processor, a processing board, a processing module, a processing apparatus, or the like. Optionally, a component in the transceiver unit 910 that is configured to implement a receiving function may be considered as a receiving unit, and a component in the transceiver unit 910 that is configured to implement a sending function may be considered as a sending unit. In other words, the transceiver unit 910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

For example, in an implementation, the processing unit 920 is configured to perform step 330 in FIG. 3, and/or the processing unit 920 is further configured to perform other processing steps on a terminal device side in the embodiments of this application. The transceiver unit 910 is further configured to perform step 310 and step 320 shown in FIG. 3, and/or the transceiver unit 910 is further configured to perform other receiving and sending steps on the terminal device side.

It should be understood that FIG. 9 is merely an example instead of a limitation. The terminal device including the transceiver unit and the processing unit may not depend on the structure shown in FIG. 9.

When the communication device 900 is a chip, the chip includes a transceiver unit and a processing unit. The transceiver unit may be an input/output circuit or a communication interface. The processing unit may be a processor, a microprocessor, or an integrated circuit integrated on the chip.

An embodiment of this application further provides a communication apparatus 1000. The communication apparatus 1000 may be a network device or a chip. The communication apparatus 1000 may be configured to perform an action performed by the network device in the foregoing method embodiments.

When the communication apparatus 1000 is a network device, for example, a base station, FIG. 10 is a simplified schematic diagram of a structure of the base station. The base station includes a part 1010 and a part 1020. The part 1010 is mainly configured to send and receive a radio frequency signal, and perform conversion between the radio frequency signal and a baseband signal. The part 1020 is mainly configured to perform baseband processing, control the base station, and so on. The part 1010 may usually be referred to as a transceiver unit, a transceiver machine, a transceiver circuit, a transceiver, or the like. The part 1020 is usually a control center of the base station, and may usually be referred to as a processing unit, configured to control the base station to perform processing operations on a network device side in the foregoing method embodiments.

The part 1010, that is, the transceiver unit, may also be referred to as a transceiver machine, a transceiver, or the like, and includes an antenna and a radio frequency unit. The radio frequency unit is mainly configured to perform radio frequency processing. Optionally, a component in the part 1010 that is configured to implement a receiving function may be considered as a receiving unit, and a component in the part 1010 that is configured to implement a sending function may be considered as a sending unit. In other words, the part 1010 includes the receiving unit and the sending unit. The receiving unit may also be referred to as a receiver machine, a receiver, a receiver circuit, or the like. The sending unit may be referred to as a transmitter machine, a transmitter, a transmit circuit, or the like.

The part 1020 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the part 1010, that is, the transceiver unit, is configured to perform step 310 and step 320 shown in FIG. 3, and/or the part 1010, that is, the transceiver unit, is further configured to perform other receiving and sending steps on the network device side in the embodiments of this application. The part 1020, that is, the processing unit, is configured to perform a processing step on the network device side in the embodiments of this application.

It should be understood that FIG. 10 is merely an example instead of a limitation. The network device including the transceiver unit and the processing unit may not depend on the structure shown in FIG. 10.

When the communication apparatus 1000 is a chip, the chip includes a transceiver unit and a processing unit. The transceiver unit may be an input/output circuit or a communication interface. The processing unit is a processor, a microprocessor, or an integrated circuit integrated on the chip.

In addition, the network device is not limited to the foregoing forms, and may alternatively be in another form. For example, the network device includes an AAU, or may further include a CU node and/or a DU node, or may include a BBU and an adaptive radio unit (adaptive radio unit, ARU), or a BBU. The network device may alternatively be customer premises equipment (customer premises equipment, CPE), or may be in another form. This is not limited in this application.

The CU and/or DU may be configured to perform an action that is implemented inside the network device and that is described in the foregoing method embodiments, and the AAU may be configured to perform an action of receiving or sending that is performed by the network device from or to the terminal device and that is described in the foregoing method embodiments. For details, refer to the descriptions in the foregoing method embodiments. Details are not described herein again.

An embodiment of this application further provides a processing apparatus, including a processor and an interface. The processor may be configured to perform the method in the foregoing method embodiments.

It should be understood that the processing apparatus may be a chip. For example, the processing apparatus may be a field programmable gate array (field programmable gate array, FPGA), an application-specific integrated chip (application specific integrated circuit, ASIC), a system on chip (system on chip, SoC), a central processing unit (central processor unit, CPU), a network processor (network processor, NP), a digital signal processing circuit (digital signal processor, DSP), a microcontroller unit (micro controller unit, MCU), a programmable controller (programmable logic device, PLD), or another integrated chip.

In an implementation process, the steps in the foregoing methods may be implemented by using a hardware integrated logic circuit in the processor, or by using instructions in a form of software. The steps in the methods disclosed with reference to the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor. To avoid repetition, details are not described herein again.

It should be noted that the processor in the embodiments of this application may be an integrated circuit chip, and has a signal processing capability. In an implementation process, the steps in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and the logical block diagrams that are disclosed in the embodiments of this application. The general-purpose processor may be a microprocessor, or the processor may be any conventional processor or the like. The steps in the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that, in the embodiments of this application, the memory may be a volatile memory or a non-volatile memory, or may include both a volatile memory and a non-volatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another appropriate type.

According to the method provided in the embodiments of this application, this application further provides a computer program product. The computer program product includes computer program code. When the computer program code is run on a computer, the computer is enabled to perform the method in any one of the embodiments shown in FIG. 3 to FIG. 6.

According to the method provided in the embodiments of this application, this application further provides a computer-readable medium. The computer-readable medium stores program code. When the program code is run on a computer, the computer is enabled to perform the method in any one of the embodiments shown in FIG. 3 to FIG. 6.

According to the method provided in the embodiments of this application, this application further provides a system. The system includes the foregoing one or more terminal devices and the foregoing one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a high-density digital video disc (digital video disc, DVD)), a semiconductor medium (for example, a solid-state disc (solid state disc, SSD)), or the like.

The network device and the terminal device in the foregoing apparatus embodiments correspond to the network device or the terminal device in the method embodiments. A corresponding module or unit performs a corresponding step. For example, the communication unit (the transceiver) performs a receiving or sending step in the method embodiments, and a step other than the sending or receiving step may be performed by the processing unit (the processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using the figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in electronic, mechanical, or other forms.

The units described as separate parts may or may not be physically separate, and parts displayed as units may or may not be physical units, to be specific, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel measurement method, comprising:
receiving a precoded reference signal and indication information, wherein the indication information indicates a relative delay between a first delay and a second delay, the relative delay comprises a difference between the first delay and the second delay, and the first delay and the second delay are determined through uplink channel measurement; and
performing channel measurement based on the precoded reference signal and the indication information.

2. The channel measurement method according to claim 1, wherein:
the precoded reference signal corresponds to one or more ports, and the one or more ports comprise a first port; and
the first delay and the second delay correspond to the first port.

3. The channel measurement method according to claim 2, wherein
the precoded reference signal is obtained by precoding a reference signal based on a first angle vector corresponding to the first port.

4. The channel measurement method according to claim 1, wherein:
the precoded reference signal corresponds to one or more ports, and the one or more ports comprise a second port and a third port; and
the first delay corresponds to the second port, and the second delay corresponds to the third port.

5. The channel measurement method according to claim 4, wherein
the precoded reference signal is obtained by precoding a reference signal based on a second angle vector corresponding to the second port and a third angle vector corresponding to the third port.

6. The channel measurement method according to claim 1, wherein that the indication information indicates a relative delay between a first delay and a second delay comprises:
the indication information indicate a relative delay of a plurality of ports, wherein the relative delay of the plurality of ports comprises the relative delay between the first delay and the second delay.

7. The channel measurement method according to claim 6, wherein the plurality of ports correspond to a same reference delay.

8. A communication apparatus, comprising:
at least one processor; and
one or more memories coupled to the at least one processor and storing programming instructions for execution by the at least one processor to perform operations comprising:
receiving a precoded reference signal and indication information, wherein the indication information indicates a relative delay between a first delay and a second delay, the relative delay comprises a difference between the first delay and the second delay, and the first delay and the second delay are determined through uplink channel measurement; and
performing channel measurement based on the precoded reference signal and the indication information.

9. The communication apparatus according to claim 8, wherein:
the precoded reference signal corresponds to one or more ports, and the one or more ports comprise a first port; and
the first delay and the second delay correspond to the first port.

10. The communication apparatus according to claim 9, wherein
the precoded reference signal is obtained by precoding a reference signal based on a first angle vector corresponding to the first port.

11. The communication apparatus according to claim 8, wherein:
the precoded reference signal corresponds to one or more ports, and the one or more ports comprise a second port and a third port; and
the first delay corresponds to the second port, and the second delay corresponds to the third port.

12. The communication apparatus according to claim 11, wherein
the precoded reference signal is obtained by precoding a reference signal based on a second angle vector corresponding to the second port and a third angle vector corresponding to the third port.

13. The communication apparatus according to claim 8, wherein that the indication information indicates a relative delay between a first delay and a second delay comprises:
the indication information indicates a relative delay of a plurality of ports, wherein the relative delay of the plurality of ports comprises the relative delay between the first delay and the second delay.

14. The communication apparatus according to claim 13, wherein the plurality of ports correspond to a same reference delay.

15. A communication apparatus, comprising:
at least one processor; and
one or more memories coupled to the at least one processor and storing programming instructions for execution by the at least one processor to perform operations comprising:
generating a precoded reference signal; and
sending the precoded reference signal and indication information, wherein the indication information indicates a relative delay between a first delay and a second delay, the relative delay comprises a difference between the first delay and the second delay, and the first delay and the second delay are determined through uplink channel measurement.

16. The communication apparatus according to claim 15, wherein:
the precoded reference signal corresponds to one or more ports, and the one or more ports comprise a first port; and
the first delay and the second delay correspond to the first port.

17. The communication apparatus according to claim 16, wherein the operations comprise:
precoding a reference signal based on a first angle vector corresponding to the first port to obtain the precoded reference signal.

18. The communication apparatus according to claim 15, wherein:
the precoded reference signal corresponds to one or more ports, and the one or more ports comprise a second port and a third port; and
the first delay corresponds to the second port, and the second delay corresponds to the third port.

19. The communication apparatus according to claim 18, wherein the operations comprise:
precoding a reference signal based on a second angle vector corresponding to the second port and a third angle vector corresponding to the third port to obtain the precoded reference signal, wherein
the second angle vector corresponds to the first delay, and the third angle vector corresponds to the second delay.

20. The communication apparatus according to claim 15, wherein that the indication information indicates a relative delay between a first delay and a second delay comprises:
the indication information indicates a relative delay of a plurality of ports, wherein the relative delay of the plurality of ports comprises the relative delay between the first delay and the second delay.

21. The communication apparatus according to claim 20, wherein the plurality of ports correspond to a same reference delay.

* * * * *